(12) United States Patent
Poirier et al.

(10) Patent No.: US 11,970,138 B2
(45) Date of Patent: Apr. 30, 2024

(54) ACCESSORY HOLDER ASSEMBLY FOR AN OFF-ROAD VEHICLE

(71) Applicant: BOMBARDIER RECREATIONAL PRODUCTS INC., Valcourt (CA)

(72) Inventors: Kevin Poirier, Racine (CA); Charles Roy, Orford (CA); Louis-Rene Sauve, Magog (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/163,670

(22) Filed: Feb. 2, 2023

(65) Prior Publication Data

US 2023/0249623 A1 Aug. 10, 2023

Related U.S. Application Data

(60) Provisional application No. 63/306,666, filed on Feb. 4, 2022.

(51) Int. Cl.
| | | |
|---|---|---|
| *B62J 9/21* | (2020.01) | |
| *B60G 5/00* | (2006.01) | |
| *B60K 1/00* | (2006.01) | |
| *B60K 11/00* | (2006.01) | |
| *B60R 5/02* | (2006.01) | |
| *B62D 1/02* | (2006.01) | |
| *B62D 21/18* | (2006.01) | |

(52) U.S. Cl.
CPC .................. *B60R 5/02* (2013.01); *B60G 5/00* (2013.01); *B60K 1/00* (2013.01); *B60K 11/00* (2013.01); *B62D 1/02* (2013.01); *B62D 21/183* (2013.01); *B60G 2300/07* (2013.01)

(58) Field of Classification Search
CPC ........ B60R 5/02; B60G 5/00; B60G 2300/07; B60K 1/00; B60K 11/00; B62D 1/02; B62D 21/183; B62J 9/21
See application file for complete search history.

(56) References Cited

U.S. PATENT DOCUMENTS

| | | | | |
|---|---|---|---|---|
| 5,573,162 | A * | 11/1996 | Spencer ..................... | B62J 9/27 224/430 |
| 6,354,476 | B1 * | 3/2002 | Alderman .................. | B62J 9/26 224/450 |
| 8,875,830 | B2 | 11/2014 | Massicotte et al. | |
| 9,815,412 | B1 * | 11/2017 | Tsumiyama ............. | B60J 1/006 |
| 10,850,806 | B2 * | 12/2020 | Labbe .................... | B62M 27/02 |
| 11,364,852 | B2 * | 6/2022 | Robillard .................. | B62J 9/27 |
| 2002/0130527 | A1 * | 9/2002 | Henderson ............... | B60J 7/141 296/100.06 |

\* cited by examiner

*Primary Examiner* — Toan C To
(74) *Attorney, Agent, or Firm* — BCF LLP

(57) ABSTRACT

An off-road vehicle has a frame, a motor, a steering input device, a storage bin disposed forward of the steering input device, the storage bin having side walls and a bottom wall, and an accessory holder assembly connected to the storage bin. The accessory holder assembly includes a receptacle having an upwardly facing receptacle aperture for receiving an accessory. The receptacle aperture is disposed within a perimeter defined by the side walls of the storage bin. The receptacle extends below the bottom wall of the storage bin. A height of a portion of the receptacle extending below the bottom wall of the storage bin being greater than a width of the receptacle aperture and greater than a length of the receptacle aperture.

20 Claims, 22 Drawing Sheets

ACCESSORY HOLDER ASSEMBLY FOR AN OFF-ROAD VEHICLE

CROSS-REFERENCE

The present application claims priority to U.S. Provisional Patent Application No. 63/306,666, entitled "Accessory Holder Assembly for an Off-Road Vehicle," filed on Feb. 4, 2022, the entirety of which is incorporated by reference herein.

TECHNICAL FIELD

The present technology relates to accessory holder assemblies for off-road vehicles.

BACKGROUND

Off-road vehicles such as all-terrain vehicles (ATVs) are used for utility and recreational purposes. The off-road vehicles may sometimes be used for transporting cargo and accessories. It is desirable to have the ability to carry elongated accessories which can be cumbersome and may not fit entirely in storage bins of the vehicle.

Thus, there is a need for accessory holder assemblies for off-road vehicles that permit different accessories to be carried while the off-road vehicle is being operated on different kinds of terrains.

SUMMARY

It is an object of the present technology to ameliorate at least some of the inconveniences present in the prior art.

In one aspect, the present technology provides an off-road vehicle having a frame, a motor connected to the frame, a steering assembly connected to the frame, the steering assembly including a steering input device, a storage bin disposed forward of the steering input device, the storage bin having side walls and a bottom wall, and an accessory holder assembly connected to the storage bin. The accessory holder assembly includes a receptacle having an upwardly facing receptacle aperture for receiving an accessory. The receptacle aperture is disposed within a perimeter defined by the side walls of the storage bin. The receptacle extends below the bottom wall of the storage bin. A height of a portion of the receptacle extending below the bottom wall of the storage bin is greater than a width of the receptacle aperture and greater than a length of the receptacle aperture.

In some implementations, the height of the portion of the receptacle extending below the bottom wall of the storage bin is greater than a height of the side walls of the storage bin.

In some implementations, the length of the receptacle aperture is greater than the width of the receptacle aperture.

In some implementations, the accessory holder assembly further includes a lock for securing the accessory holder assembly to the off-road vehicle.

In some implementations, the accessory holder assembly further includes a bracket connected to the receptacle, the lock is mounted to the bracket, and the bracket has a platform for supporting a first portion of the accessory when a second portion of the accessory is received in the receptacle.

In some implementations, the bracket has first and second portions defining a L-shape. The first portion is removably connected to the receptacle and extends in the storage bin. The second portion projects laterally away from the first portion and outside the perimeter defined by the side walls of the storage bin. The lock is mounted to the second portion of the bracket. The lock includes a latch member, and the off-road vehicle defines a recess for receiving the latch member of the lock.

In some implementations, the lock is a manually operable lock.

In some implementations, the bottom wall of the storage bin defines a bin aperture, and the receptacle extends through the bin aperture.

In some implementations, the accessory holder assembly further has a flange surrounding at least in part the receptacle aperture and a tab projecting from the receptacle below the flange. The flange abuts an upper face of the bottom wall of the storage bin surrounding the bin aperture, and the tab extends under a lower face of the bottom wall of the storage bin adjacent the bin aperture such that the bottom wall of the storage bin is retained between the flange and the tab.

In some implementations, the accessory holder assembly further includes an extension sleeve removably connected to the receptacle, the extension sleeve extending in the storage bin, above the bottom wall of the storage bin.

In some implementations, the accessory holder assembly further includes a resilient liner disposed inside the extension sleeve, and a clamp for retaining the accessory inside the extension sleeve.

In some implementations, the clamp includes a cam lever assembly movable between a clamped position and an unclamped position, the cam lever assembly biasing the resilient liner for retaining the accessory inside the extension sleeve when moved from the unclamped position to the clamped position.

In some implementations, the off-road vehicle further includes a radiator assembly connected to the frame and fluidly connected to the motor, the accessory holder assembly being disposed rearward of the radiator assembly.

In some implementations, the receptacle is secured to the radiator assembly.

In some implementations, the off-road vehicle further includes left and right front suspension assemblies operatively connected to the frame, each of the left and right front suspension assemblies including a shock absorber assembly, and left and right front ground engaging members operatively connected to the left and right front suspension assemblies respectively, and the receptacle is disposed forward of the shock absorber assemblies.

In some implementations, each of the shock absorber assemblies has an upper end and a lower end, and the receptacle is disposed laterally between the upper end and the lower end of one of the shock absorber assemblies.

In some implementations, the off-road vehicle further includes a front axle assembly operatively connected to the left and right front ground engaging member, the receptacle being disposed forward of the front axle assembly.

In some implementations, the receptacle is skewed relative to the bottom wall of the storage bin.

In some implementations, the accessory holder assembly is a first accessory holder assembly and the off-road vehicle further comprises a second accessory holder assembly, the second accessory holder assembly including a receptacle having an upwardly facing receptacle aperture for receiving another accessory, the receptacle aperture being disposed within the perimeter defined by the side walls of the storage bin, the receptacle extending below the bottom wall of the storage bin, and a height of a portion of the receptacle extending below the bottom wall of the storage bin being greater than a width of the receptacle aperture and greater than a length of the receptacle aperture. The first and second accessory holder assemblies are disposed on opposite sides of a longitudinal center plane of the off-road vehicle.

In some implementations, the off-road vehicle further includes a front differential assembly connected to the frame and operatively connected to the motor, the longitudinal center plane intersecting the front differential assembly, and the first accessory holder assembly is disposed on a first side of the front differential assembly, and the second accessory holder assembly is disposed on a second side of the front differential assembly.

In some implementations, the accessory holder assembly further includes a drain assembly connected to a bottom of the receptacle and fluidly communicating with the receptacle.

In some implementations, the drain assembly is a duck bill drain.

In some implementations, the off-road vehicle further includes a storage bin lid removably connected to the storage bin and preventing access to the receptacle aperture when closed.

In some implementations, a portion of the accessory holder assembly extends outside the storage bin when the storage bin lid is closed.

In some implementations, the accessory is a chainsaw having a blade, the receptacle being shaped to fit the blade of the chainsaw.

In some implementations, the off-road vehicle is an all-terrain vehicle, the steering input device is a handlebar, the off-road vehicle has a straddle seat connected to the frame, and the motor is disposed under the straddle seat.

According to another aspect of the present technology, there is provided a bin assembly for an off-road vehicle, including a storage bin having side walls and a bottom wall, and an accessory holder assembly connected to the storage bin. The accessory holder assembly includes a receptacle having an upwardly facing receptacle aperture for receiving an accessory, the receptacle aperture being disposed within a perimeter defined by the side walls of the storage bin, the receptacle extending below the bottom wall of the storage bin, and a height of a portion of the receptacle extending below the bottom wall of the storage bin being greater than a width of the receptacle aperture and greater than a length of the receptacle aperture.

In some implementations, the height of the portion of the receptacle extending below the bottom wall of the storage bin is greater than a height of the side walls of the storage bin.

In some implementations, the length of the receptacle aperture is greater than the width of the receptacle aperture.

In some implementations, the bottom wall of the storage bin defines a bin aperture, and the receptacle extends through the bin aperture.

In some implementations, the accessory holder assembly further has a flange surrounding at least in part the receptacle aperture and a tab projecting from the receptacle below the flange. The flange abuts an upper face of the bottom wall of the storage bin surrounding the bin aperture, and the tab extends under a lower face of the bottom wall of the storage bin adjacent the bin aperture such that the bottom wall of the storage bin is retained between the flange and the tab.

In some implementations, the accessory holder assembly further includes an extension sleeve removably connected to the receptacle, the extension sleeve extending in the storage bin, above the bottom wall of the storage bin.

In some implementations, the receptacle is skewed relative to the bottom wall of the storage bin.

In some implementations, the bin assembly further includes a storage bin lid removably connected to the storage bin and preventing access to the receptacle aperture when closed.

According to yet another aspect of the present technology, there is provided an accessory holder assembly connectable to a storage bin of an off-road vehicle, the accessory holder assembly including a receptacle having an upwardly facing receptacle aperture for receiving an accessory, a bracket connected to the receptacle, the bracket having a platform for supporting a first portion of the accessory when a second portion of the accessory is received in the receptacle, and a lock mounted to the bracket.

In some implementations, the lock is a manually operable lock.

In some implementations, the bracket has first and second portions defining a L-shape. The first portion includes an extension sleeve connected to the receptacle, the second portion projects laterally away from the first portion, and the lock is mounted to the second portion of the bracket.

In some implementations, the accessory holder assembly further includes a resilient liner disposed inside the extension sleeve, and a clamp for retaining the accessory inside the extension sleeve, the clamp biasing the resilient liner for retaining the accessory inside the extension sleeve when moved from an unclamped position to a clamped position.

In some implementations, the accessory holder assembly further includes a drain assembly connected to a bottom of the receptacle and fluidly communicating with the receptacle.

In some implementations, the drain assembly is a duck bill drain.

According to yet another aspect of the present technology, there is provided an accessory holder assembly connectable to an off-road vehicle. The accessory holder assembly includes a receptacle defining an upwardly facing receptacle aperture for receiving an accessory, and a bottom opposite the receptacle aperture. The receptacle is insertable in an aperture defined in the off-road vehicle. The accessory holder assembly further includes a flange projecting from the receptacle, the flange being structured to abut a portion of the off-road vehicle surrounding the aperture, and at least one connector disposed between the flange and the bottom of the receptacle for connecting the receptacle to the off-road vehicle.

In some implementations, the at least connector includes at least one of tabs and mounting brackets projecting from the receptacle.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Furthermore, in the context of the present application, "outwardly" or "outward" means away from a longitudinal center plane of the frame of the vehicle, and "inwardly" or "inward" means toward the longitudinal center plane of the frame of the vehicle.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a four-wheeled straddle-seat all-terrain vehicle (ATV) 10. However, it is contemplated that aspects of the present technology could be used in other types of off-road vehicles, such as three-wheeled vehicles, side-by-side off-road vehicles (SSVs), motorcycles, snowmobiles and the like.

Figure 1:
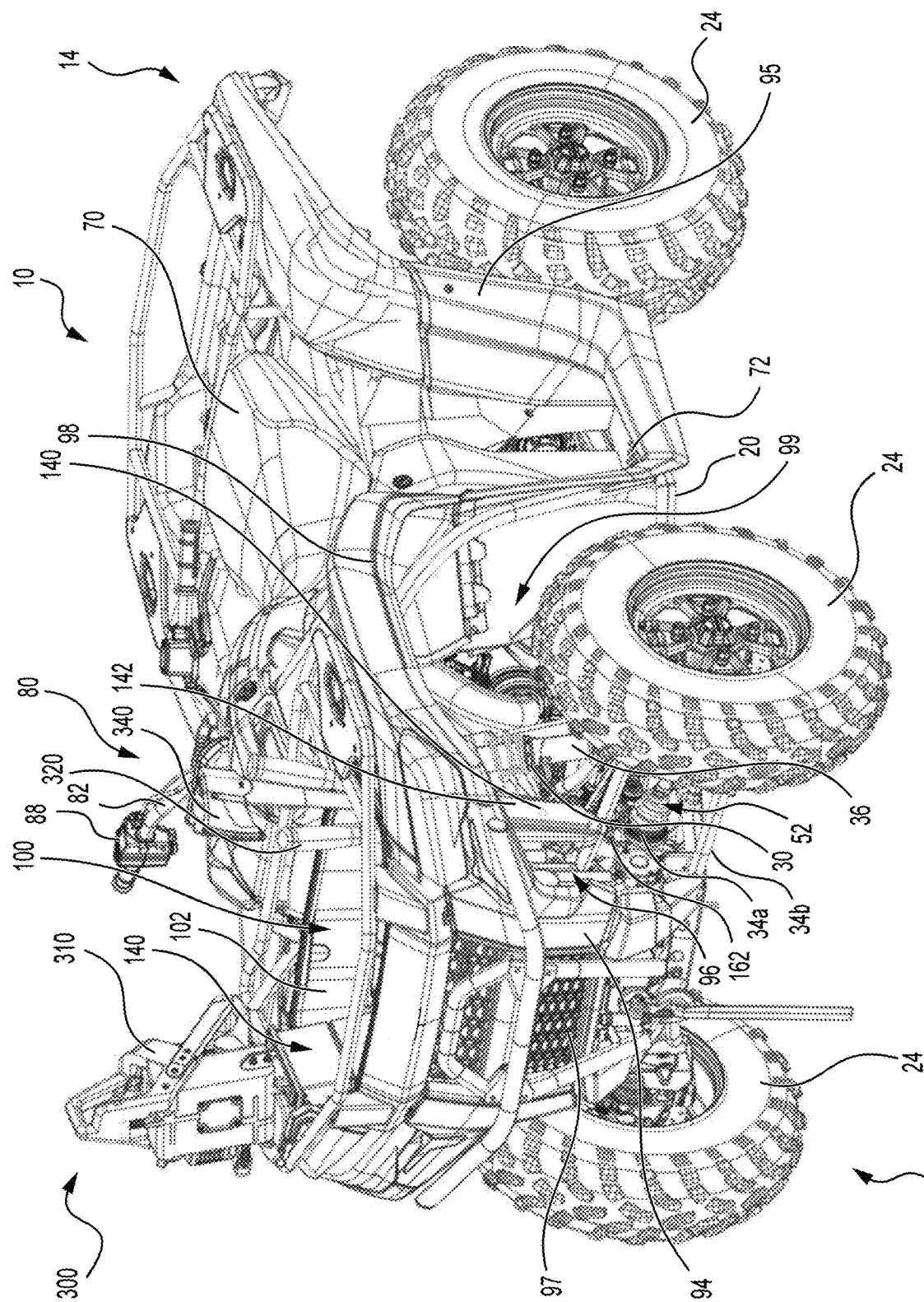
FIG. 1 is a perspective view, taken from a front, left side, of a straddle-seat off-road vehicle, with accessories being received in accessory holder assemblies disposed in the front storage bin.
Figure 2:
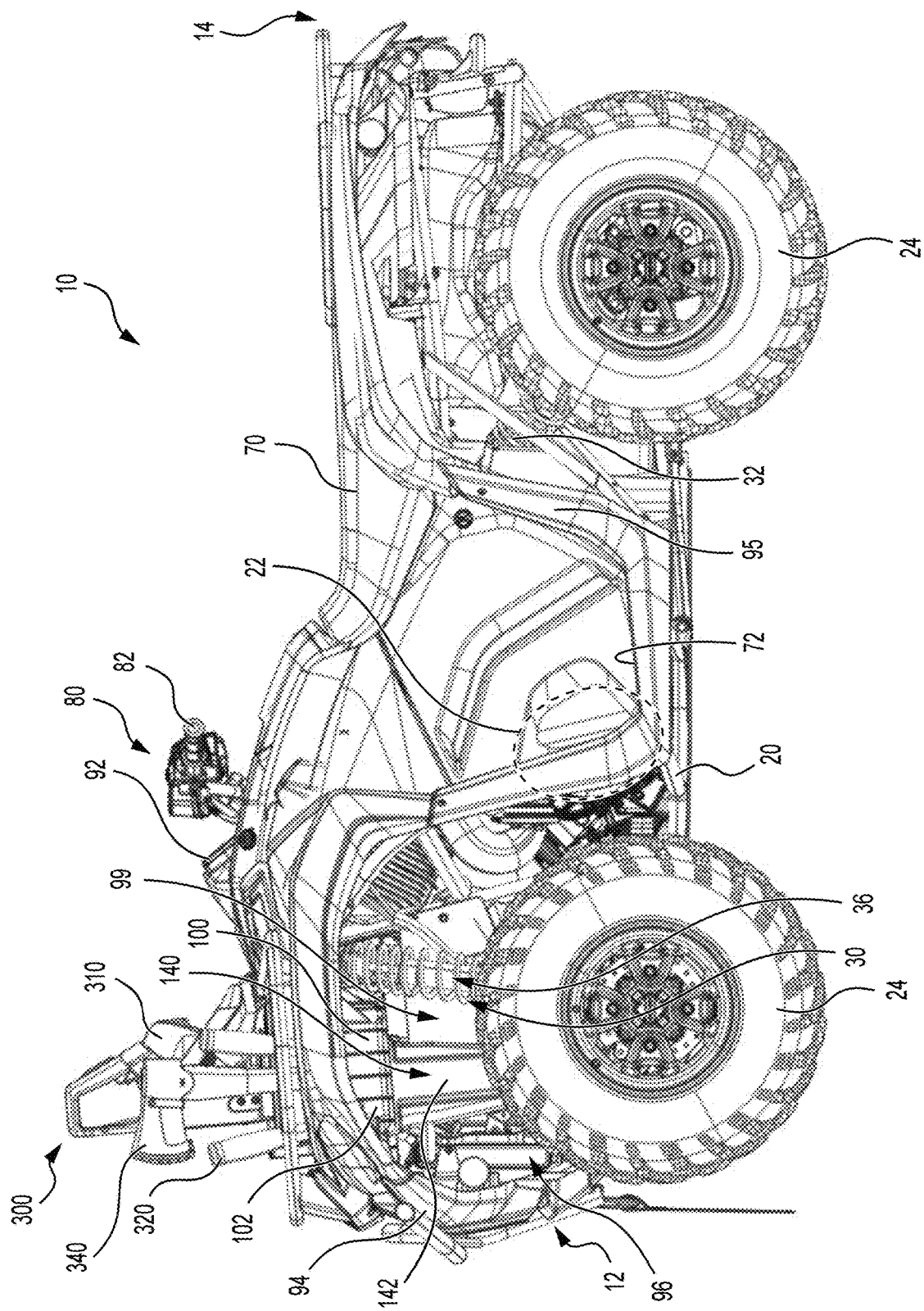
FIG. 2 is a left side elevation view of the vehicle of FIG. 1.
Figure 3:
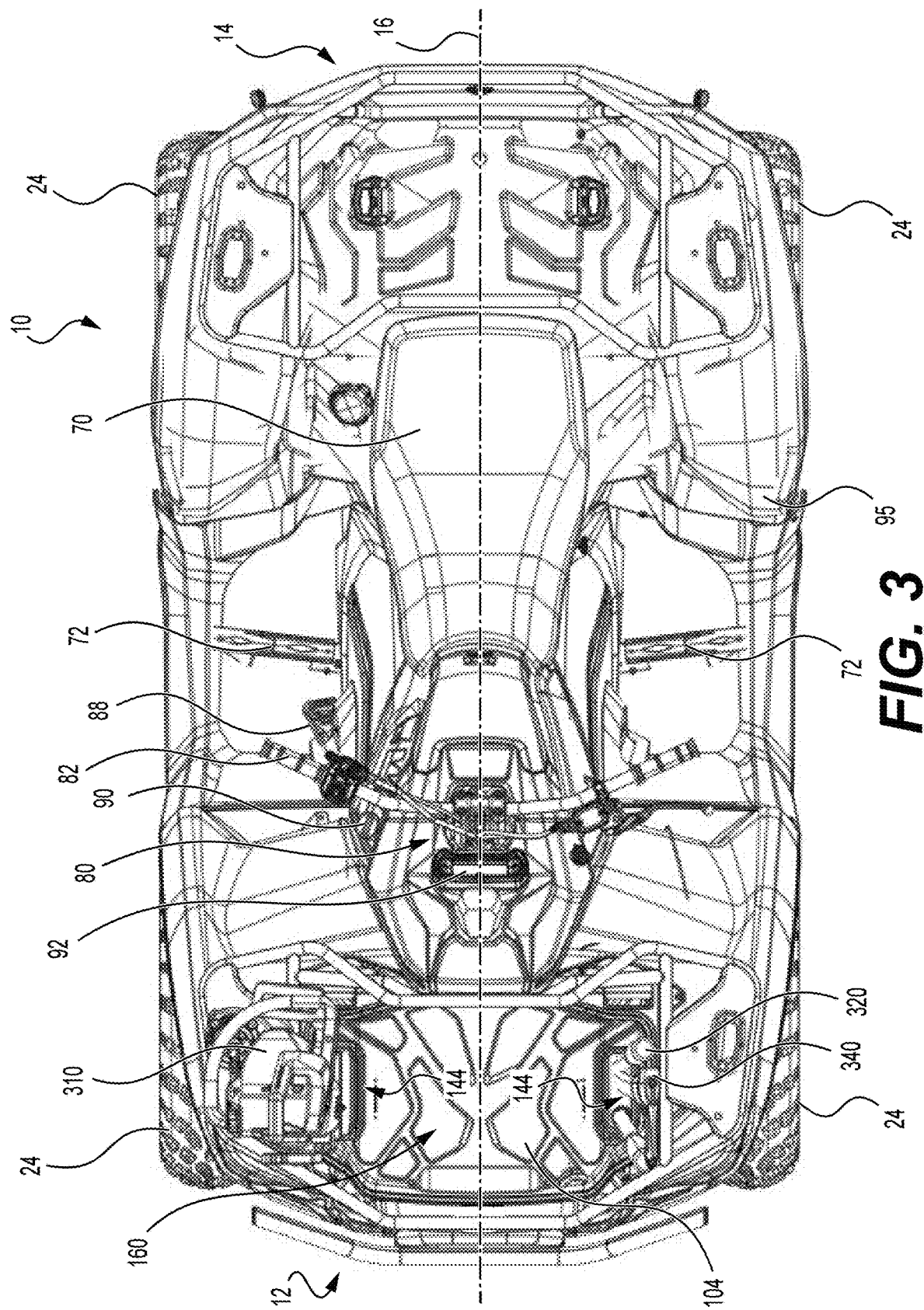
FIG. 3 is a top plan view of the vehicle of FIG. 1.

Referring to FIGS. 1 to 3, the ATV 10 has a front end 12 and a rear end 14 defined consistently with a forward travel direction of the ATV 10. A longitudinal center plane 16 (FIG. 3) extends vertically and longitudinally through the lateral center of the ATV 10. The ATV 10 has a frame 20 to which is mounted a motor 22 (schematically shown in FIG. 2) for powering the ATV 10. The ATV 10 has two front wheels 24 and two rear wheels 24. The wheels 24 are operatively connected to the motor 22 via a transmission (not shown). Each of the four wheels 24 is provided with low-pressure balloon tires adapted for off-road conditions and traversing rugged terrain. It is contemplated that the ATV 10 could have only three wheels 24. It is also contemplated that different ground engaging members, such as skis and a track assembly, could be used in other off-road vehicles.

Figure 14:
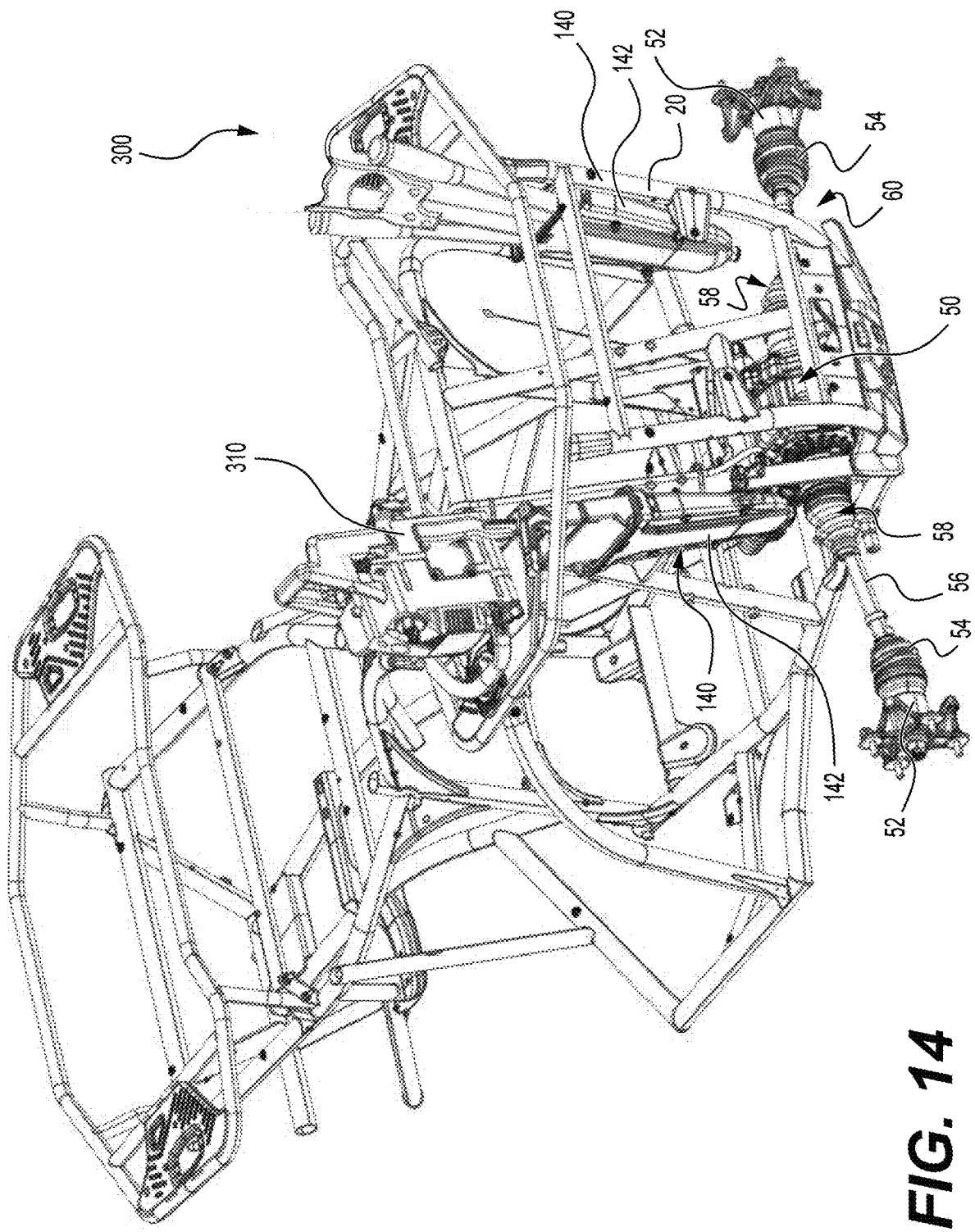
FIG. 14 is a perspective view taken from a front, right side, of a frame of the vehicle of FIG. 1, with the accessory holder assemblies, accessories received in the accessory holder assemblies and the front axle assembly.

The two front wheels 24 are suspended from the frame 20 by left and right front suspension assemblies 30 while the two rear wheels 24 are suspended from the frame 20 by left and right rear suspension assemblies 32. Each front suspension assembly 30 includes upper and lower A-arms 34a, 34b and a shock absorber assembly 36, best seen in FIGS. 6 to 9. The A-arms 34a, 34b have one end pivotally connected to the frame 20, and the other end supporting a kingpin 38 of its corresponding left or right front wheel 24. Each shock absorber assembly 36 has a lower end 40 pivotally connected to its corresponding upper A-arm 34a and an upper end 42 pivotally connected to the frame 20. Referring to FIG. 14, each of the left and right kingpins 38 is operatively connected to a front differential assembly 50 via a wheel axle 52 connected to the kingpin 38, a universal joint 54 connected to the wheel axle 52, a half-shaft 56, and a universal joint 58 connected to the front differential assembly 50. The universal joints 54, 58 are covered by boots. The front differential assembly 50 is connected to the frame 20 and disposed such that the longitudinal center plane 16 intersects the front differential assembly 50 (FIGS. 7 and 9). The left and right kingpins 38, wheel axles 52, universal joints 54, half-shafts 56, universal joints 58 and the front differential assembly 50 together form a front axle assembly 60 of the ATV 10, best seen in FIGS. 14 and 15. The front axle assembly 60 operatively connects the front wheels 24 to the motor 22 and transmission of the ATV 10.

Referring back to FIGS. 1 to 3, the ATV 10 further includes a straddle seat 70 connected to the frame 20 for accommodating a driver of the ATV 10. The motor 22 is disposed under the straddle seat 70. Driver footrests 72 are provided on either side of the driver seat 70 and are disposed vertically lower than the driver seat 70 to support the driver's feet. A steering assembly 80 is rotationally connected the frame 20 to enable a driver to steer the ATV 10. The steering assembly 80 includes a handlebar 82 connected to a steering column assembly 84 (FIG. 6) for actuating steering linkages operatively connected to left and right front wheels 24. Other steering input devices, such as a steering wheel, could be used in different vehicles.

A throttle operator 88 (FIGS. 1 and 3), in the form of a thumb-actuated throttle lever, is mounted to the handlebar 82. Other types of throttle operators, such as a finger-actuated throttle lever and a twist grip, are also contemplated. A gear shifter 90 (FIG. 3) located near the handlebar 82 is connected to the transmission and enables a driver to select one of a plurality of gear configurations for operation of the vehicle 10. In the illustrated implementation of the vehicle 10, the gear configurations include park, neutral, reverse, low, and drive. It is contemplated that the sequence and/or number of gear configurations could be different than as shown herein. A display cluster 92, including a number of gauges and buttons, is disposed forwardly of the steering assembly 80.

The ATV 10 also includes fairings 94 including several side panels 95 extending over a lateral side of the ATV 10. A radiator assembly 96 is connected to the frame 20 of the ATV 10. The radiator assembly 96 is fluidly connected to the motor 22 via conduits 96a, 96b, best seen in FIG. 8. A coolant reservoir 96c is also fluidly connected to the radiator assembly 96. The radiator assembly 96 is disposed rearward of a front grille 97 and the fairings 94 forming the front fascia of the ATV 10. A fender 98 is disposed over each wheel 24 to protect the driver and/or passenger from dirt, water and other debris being projected by the rotating wheels 24. The fenders 98 also define a portion of the wheel well 99 in which each one of the wheels 24 rotates and, in the case of the front wheels 24, steers.

The ATV 10 further includes other components such as an air intake system, an exhaust system, headlights, and the like. As it is believed that these components would be readily recognized by one of ordinary skill in the art, further explanation and description of these components will not be provided herein.

Figure 4:
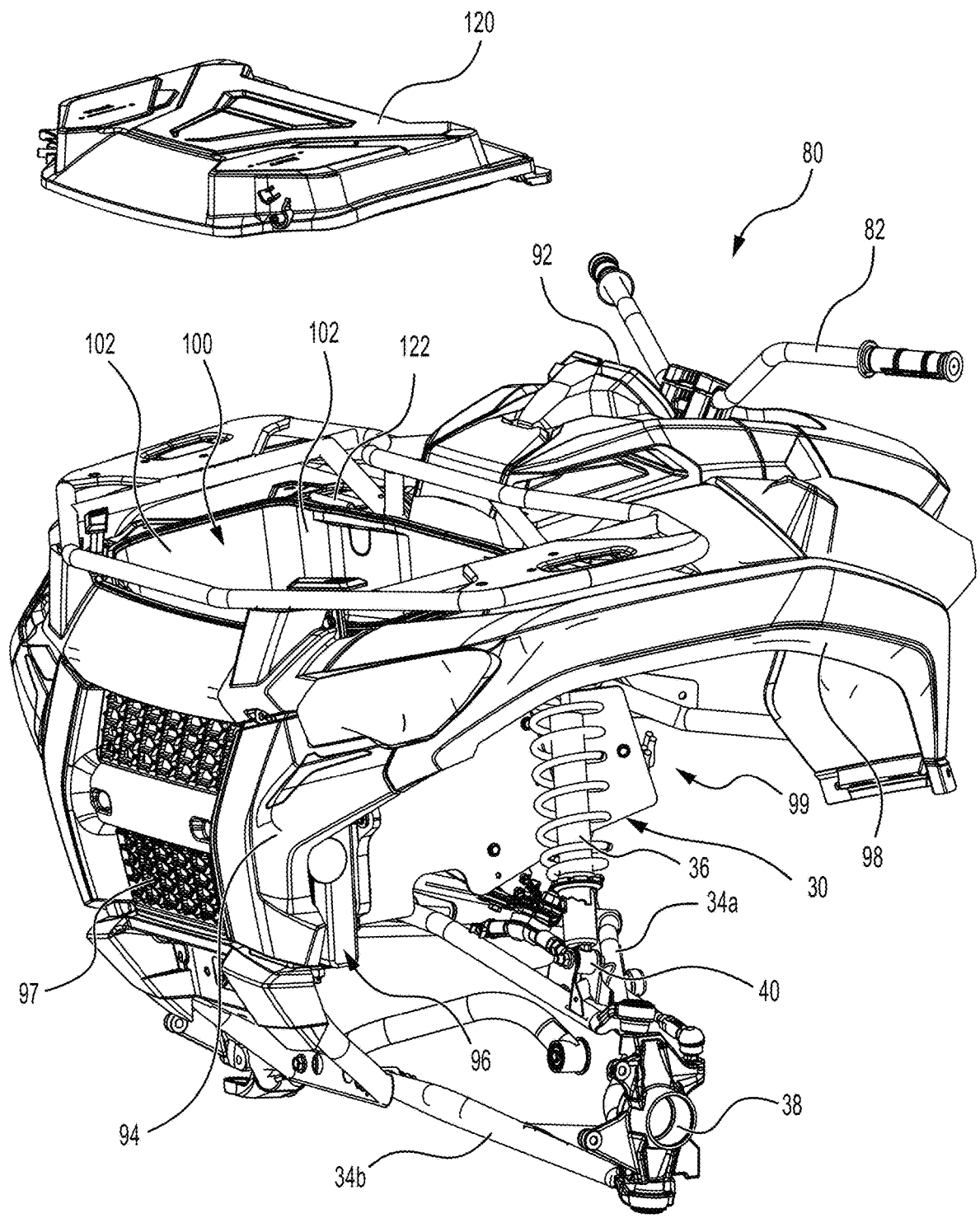
FIG. 4 is a perspective view, taken from a front, left side, of a front portion of the vehicle of FIG. 1, with a storage bin lid disposed above the front storage bin, and the accessories and accessory holder assemblies removed from the front storage bin.
Figure 5:
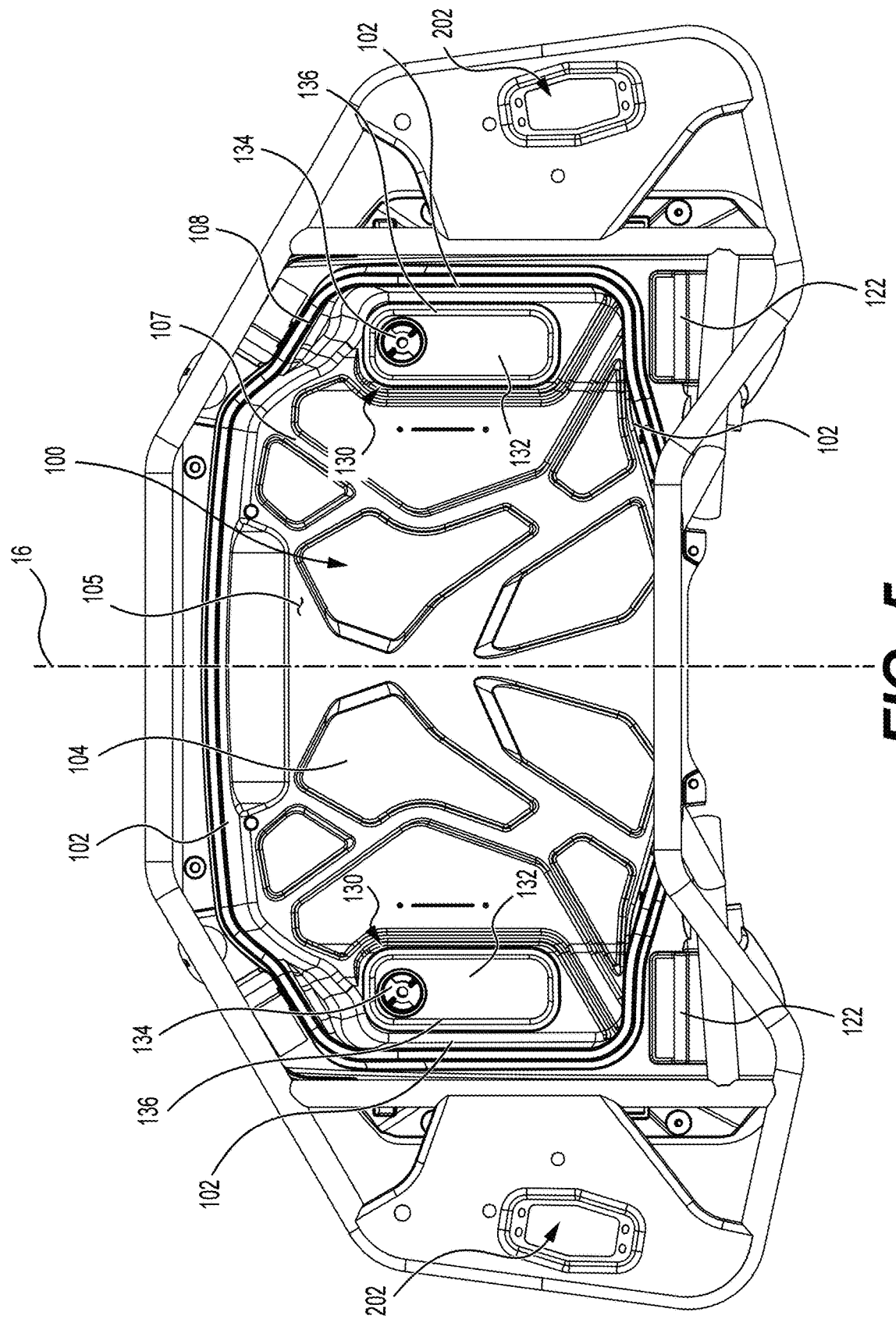
FIG. 5 is a top plan view of the front storage bin of the front portion of the vehicle of FIG. 4.
Figure 6:
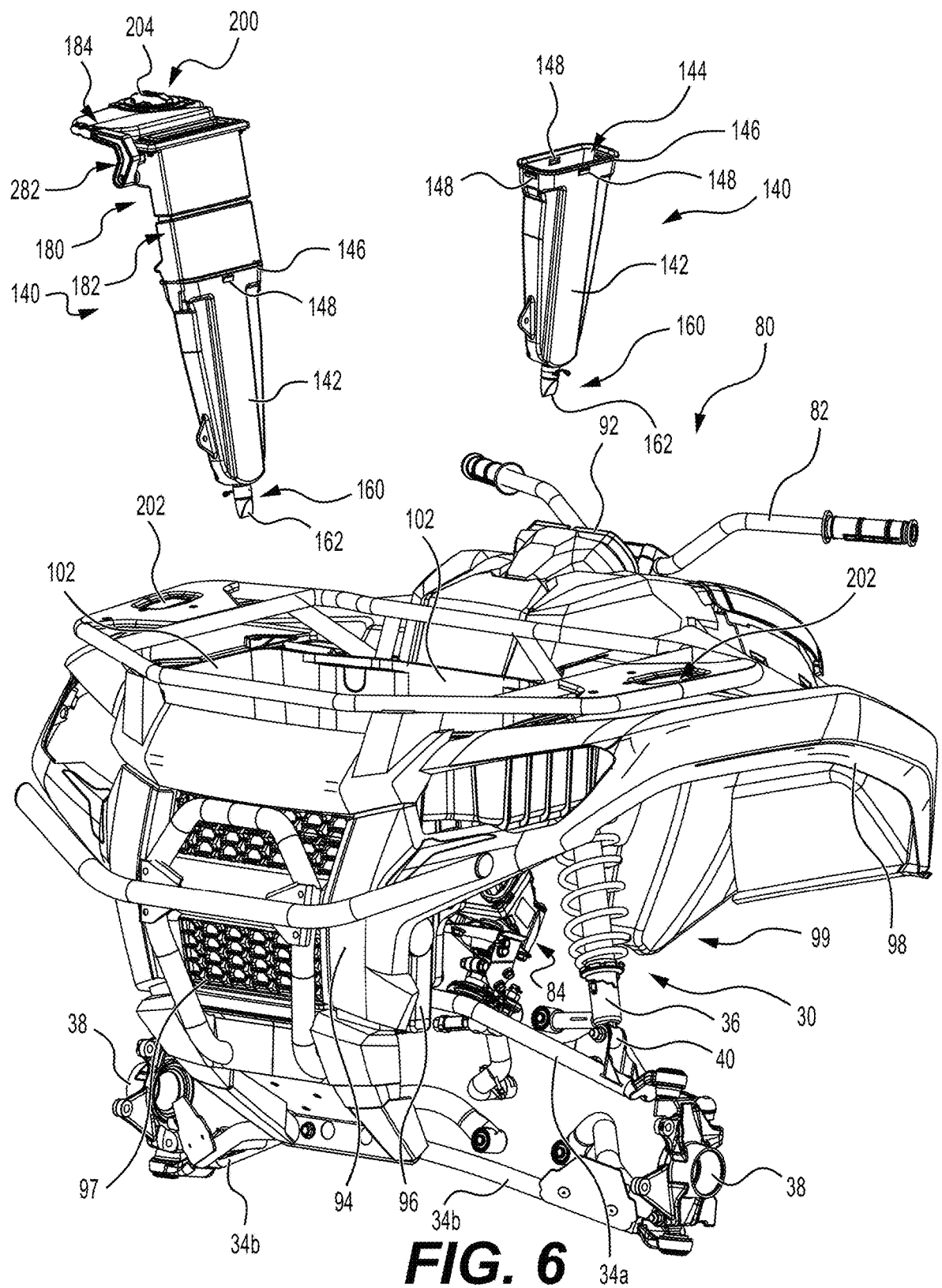
FIG. 6 is a perspective view, taken from a front, left side, of the front portion of the vehicle of FIG. 4, with the storage bin lid omitted and accessory holder assemblies about to be inserted into the front storage bin.
Figure 7:
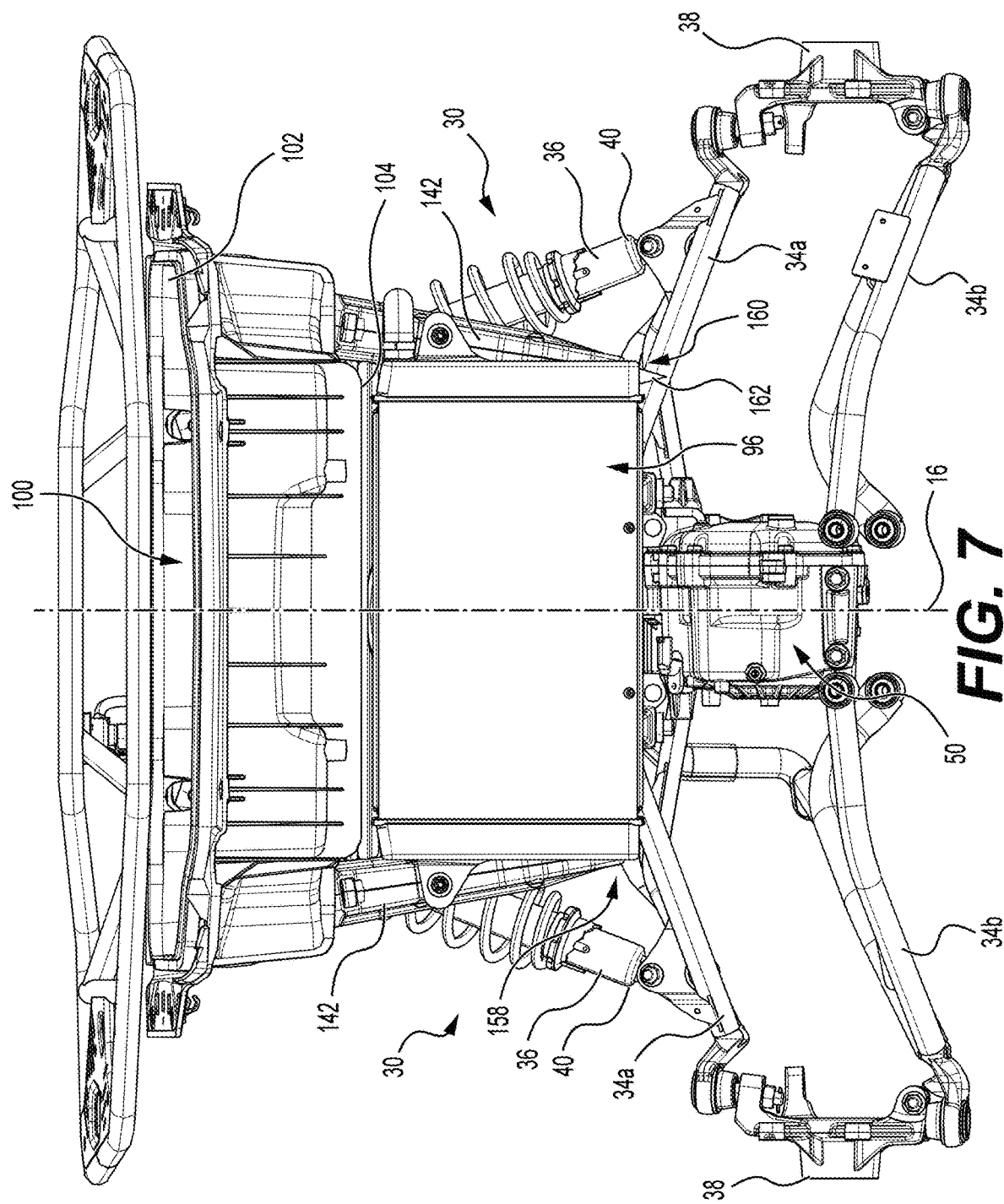
FIG. 7 is a front elevation view of the front portion of the vehicle of FIG. 4, with the front differential assembly shown and the fairings and the steering assembly omitted, and the receptacles of the accessory holder assemblies connected to the front storage bin.
Figure 8:
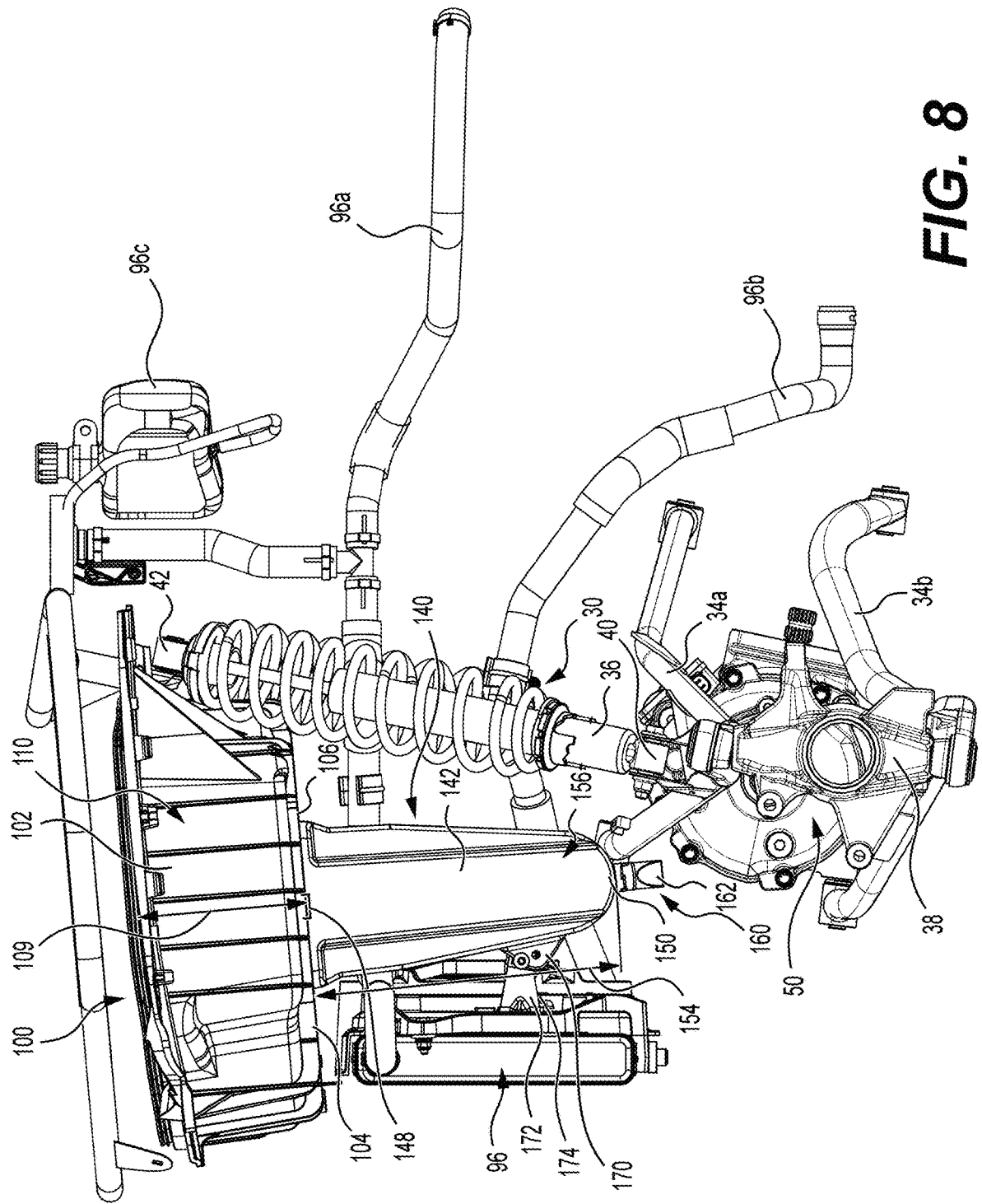
FIG. 8 is left side elevation view of the components of the front portion of the vehicle shown in FIG. 7.
Figure 9:
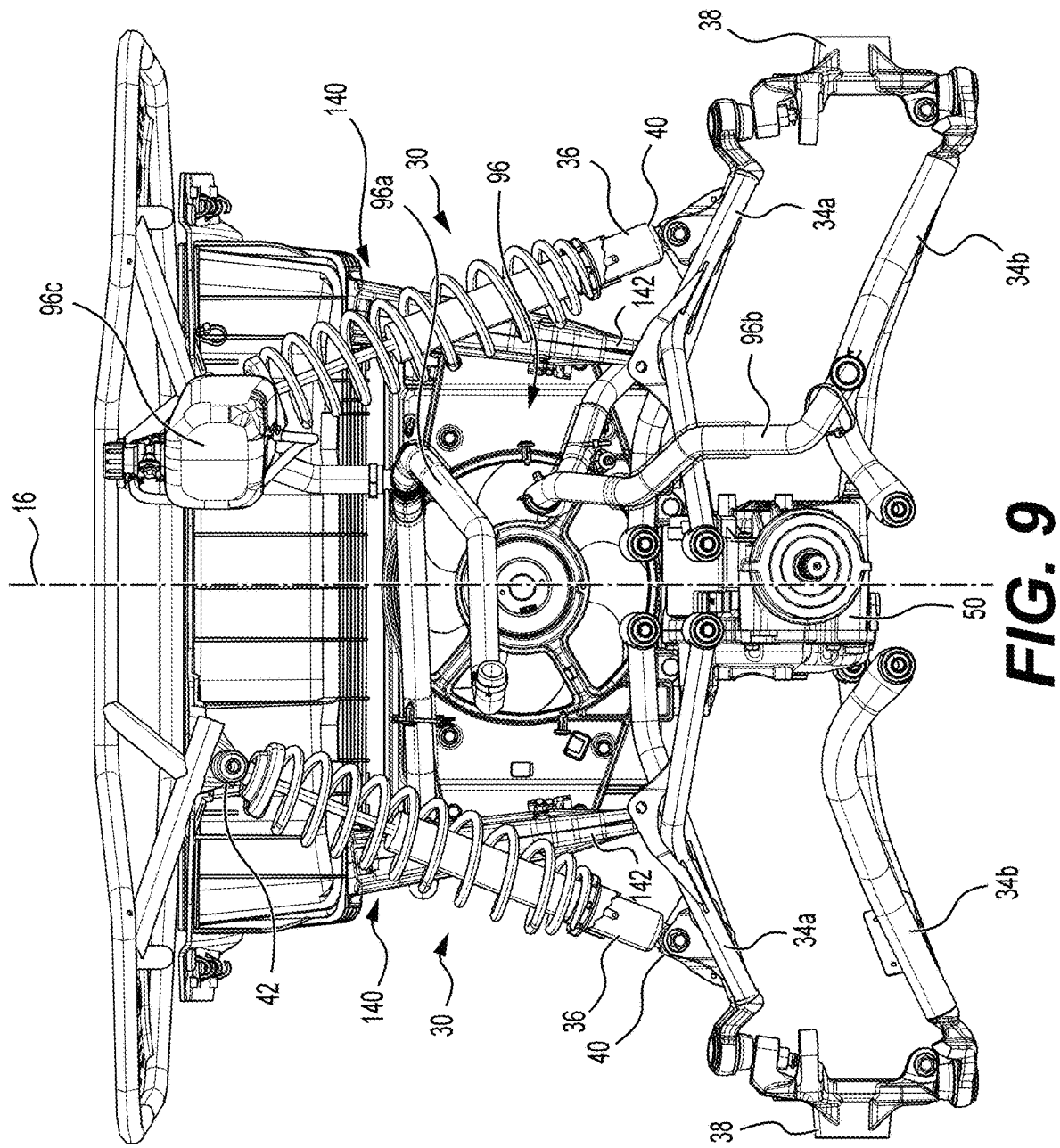
FIG. 9 is a rear elevation view of the components of the front portion of the vehicle shown in FIG. 7.
Figure 10:
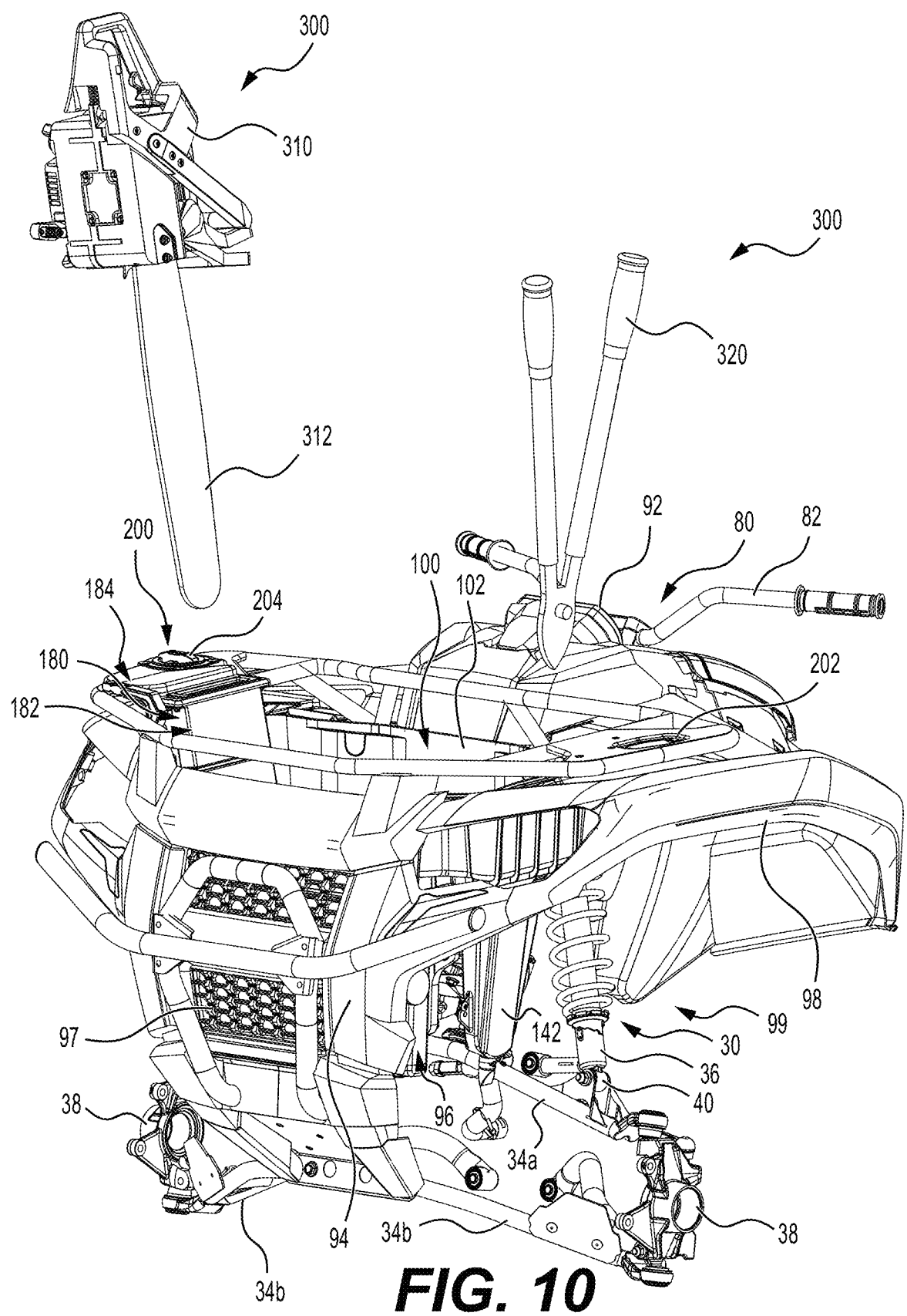
FIG. 10 is a perspective view, taken from a front, left side, of the front portion of the vehicle of FIG. 6, with the accessory holder assemblies connected to the front storage bin and a first set of accessories about to be inserted in the accessory holder assemblies.
Figure 11:
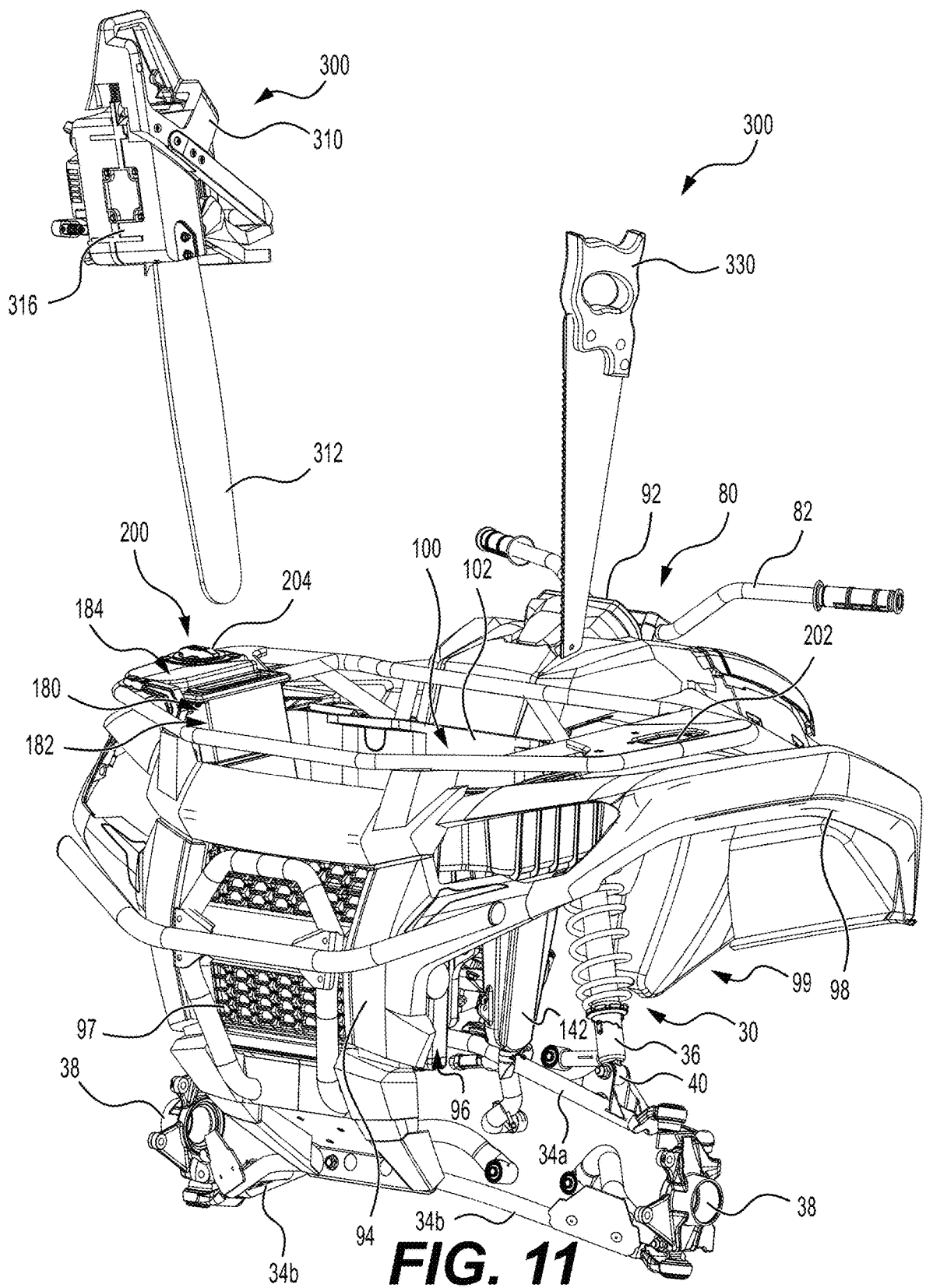
FIG. 11 is a perspective view, taken from a front, left side, of the front portion of the vehicle of FIG. 10, with a second set of accessories about to be inserted into the accessory holder assemblies.

Referring to FIGS. 4 to 8, the ATV 10 includes a front storage bin 100 disposed forward of the handlebar 82. The storage bin 100 has side walls 102 and a bottom wall 104. The bottom wall 104 has an upper face 105 (FIG. 5) and a lower face 106 (FIG. 8). Referring to FIG. 5, the bottom wall 104 further has ridges 107 to enhance the structural rigidity thereof. The side walls 102 define a perimeter 108 of the storage bin 100 when seen from above, as in FIG. 5. In other words, the perimeter 108 of the storage bin 100 is defined by the side walls 102 when looking down into the storage bin 100. The side walls 102 have a height 109, best seen in FIG. 8, defined between the bottom wall 104 and the upper edge of the side walls 102. The perimeter 108 and the height 109 define a volume 110 (FIG. 8) of the storage bin 100.

Referring to FIGS. 4 and 5, a storage bin lid 120 is removably connected to the storage bin 100 and prevents access to the volume 110 of the storage bin 100 when closed. When connected, the storage bin lid 120 is hingedly connected to the storage bin 100 via hinges 122 (FIGS. 4 and 5).

Referring to FIG. 5, left and right bin apertures 130 are defined in the bottom wall 104 of the storage bin 100. The left and right bin apertures 130 are respectively disposed on the left and right sides of the longitudinal center plane 16 of the ATV 10. The left and right bin apertures 130 are shaped as rectangles having rounded corners. The bin apertures 130 extend lengthwise parallel to the longitudinal center plane 16 of the ATV 10. The bin apertures 130 could be shaped and/or positioned otherwise in other implementations. Each bin aperture 130 is covered by a removable panel 132. The bottom wall 104 and the panels 132 are integrally formed, and the panels 132 can be cut out or otherwise removed from the bottom wall 104 of the storage bin 100. A recess 136 defined around each panel 132 indicates to a user where to cut in order to remove the panels 132 from the bottom wall 104. Drains 134 are provided on each removable panel 132. The drains 134 are used to empty the front storage bin 100 from any liquids and debris it could contain. The drains 134 are removed from the storage bin 100 when the panels 132 are removed. In other implementations, the panels 132 could be configured to be selectively connected to the storage bin 100.

Figure 13:
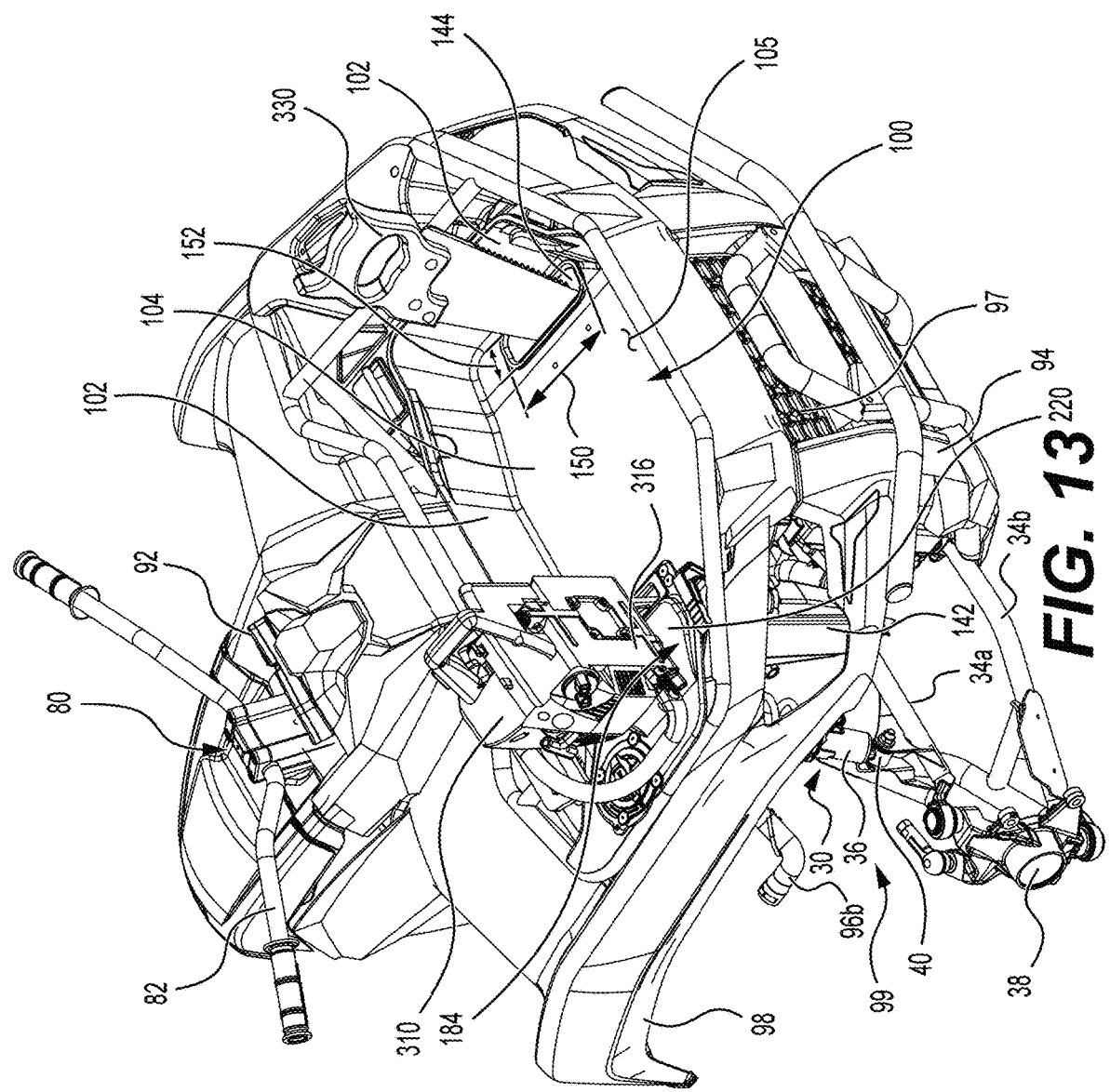
FIG. 13 is a perspective view, taken from a top, front, right side, of the front portion of the vehicle of FIG. 12.

Referring to FIGS. 1 to 3 and 6, left and right accessory holder assemblies 140 will be generally described. The left and right accessory holder assemblies 140 are connectable to the front storage bin 100. The left and right accessory holder assemblies 140 are disposed on the left and right sides of the longitudinal center plane 16 of the ATV 10. Each of the accessory holder assemblies 140 includes a receptacle 142. The receptacle 142 has an upwardly facing receptacle aperture 144 for receiving an accessory 300. The receptacle aperture 144 of the left receptacle 142 is best seen in FIGS. 6 and 13.

As seen in FIGS. 1 to 3, 10 and 11, different accessories 300, such as a chainsaw 310, a snipper 320, or a saw 330, can be received in either one of the receptacles 142. In FIGS. 1 to 3, it is shown that the left receptacle 142 can receive simultaneously a snipper 320 and an axe 340. Thus, more than one accessory 300 can be received in each receptacle 142. In the illustrated implementation, the right receptacle 142 is shaped to fit a blade 312 of the chainsaw 310, and can receive the snipper 320 or the saw 330 as well. Other accessories 300 are also contemplated to be received in the receptacles 142. The receptacles 142 could also be shaped to fit a particular accessory 300.

Figure 12:
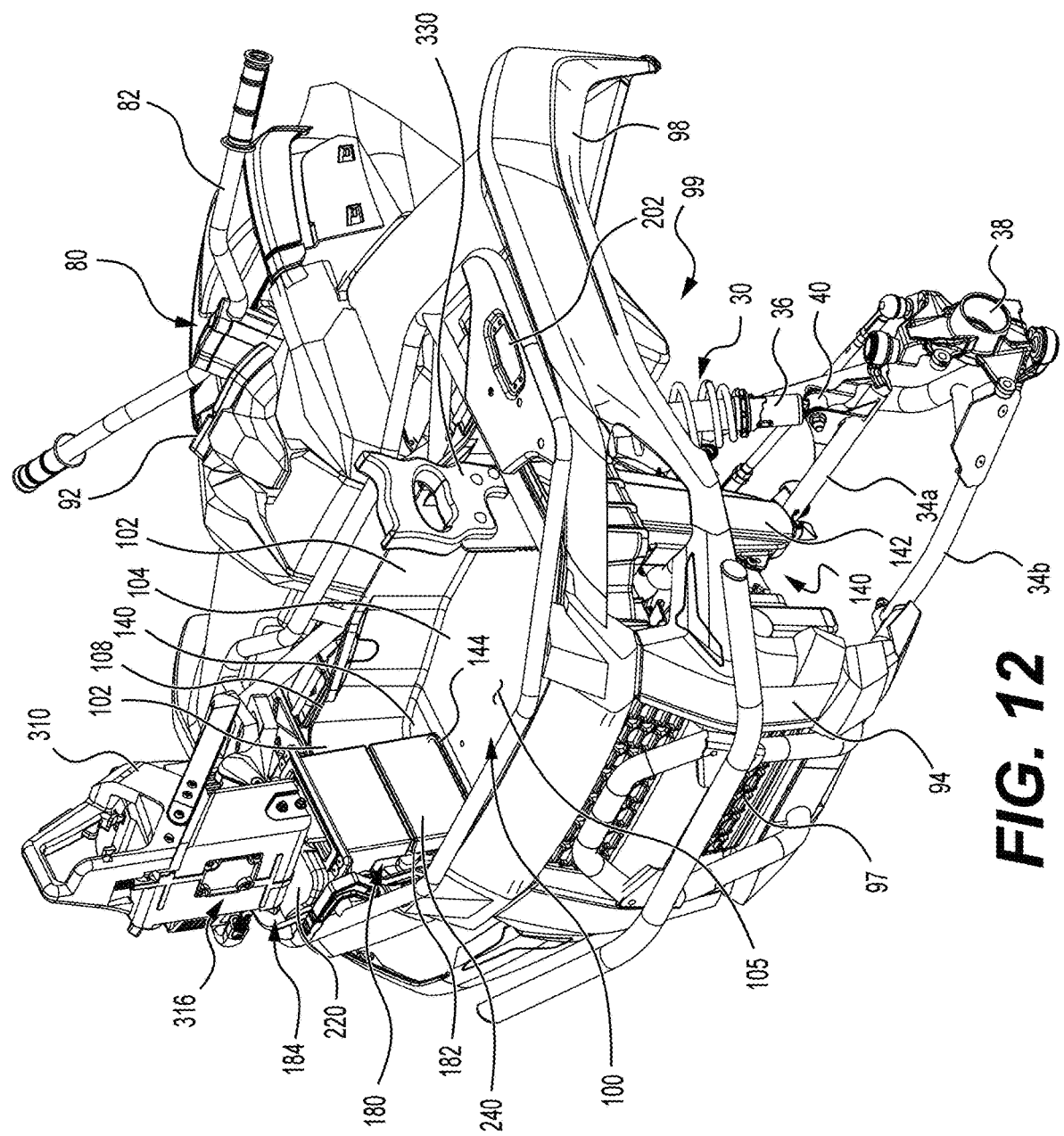
FIG. 12 is a perspective view, taken from a top, front, left side, of the front portion of the vehicle of FIG. 11, with the second set of accessories received in the accessory holder assemblies.

The accessories 300 shown as examples in the accompanying Figures are elongated items which would normally not fit entirely inside the volume 110 of the front storage bin 100. When placed in the storage bin 100, any one of these accessories 300 would lie on the bottom wall 104 and on the upper edge of the side walls 102, and project outside the storage bin 100. Such positioning of the accessory 300 would render it unstable and prone to movements inside the storage bin 100 while the ATV 10 is operated, if not anchored. In contrast, when received in the receptacle 142 of the accessory holder assembly 140 of the present technology, the accessory 300 is less prone to movements while the ATV 10 is operated. The accessory 300 is thus less exposed to risks of being damaged and/or ejected from the storage bin 100 while the ATV 10 is operated. In addition, when received in the receptacle 142 of the accessory holder assembly 140 of the present technology, the accessory 300 does not obstruct the straight-ahead view of the driver, and leaves a center portion of the volume 110 of the front storage bin 100 free of encumbrances, as seen in FIGS. 3, 12 and 13. The empty volume 110 can thus be used to carry additional items in the front storage bin 100.

Referring to FIGS. 5 to 9, the connection of the left and right receptacles 142 to the storage bin 100 and their positioning relative to various components of the ATV 10 will be described. Since the left and right receptacles 142 have similar features, the following description applies to both left and right receptacles 142, unless mentioned otherwise.

When the panels 132 are removed from the bottom wall 104 of the front storage bin 100, the accessory holder assemblies 140 are inserted into the storage bin 100 from above (as seen in FIG. 6) such that their respective receptacle 142 extends through the bin aperture 130. When fully inserted therein, a flange 146 (FIGS. 6, 16A and 16B) surrounding the receptacle aperture 144 abuts the upper face 105 of the bottom wall 104 surrounding the bin aperture 130. Tabs 148 project from the receptacle 142 below the flange 146. The tabs 148 extend under the lower face 106 of the bottom wall 104 of the storage bin 100 adjacent the bin aperture 130 (FIG. 8). Thus, when the receptacle 142 is fully inserted and extends through the bin aperture 130, the bottom wall 104 of the storage bin 100 is retained between the flange 146 and the tab 148, thereby connecting the accessory holder assembly 140 to the storage bin 100.

In other words, when fully inserted into the bin aperture 130, the receptacle 142 is selectively connected to the bottom wall 104 of the storage bin 100 via (i) the flange 146 abutting and mating with the upper face 105 of the bottom wall 104 in an area surrounding the bin aperture 130 including the remaining portion of the recess 136, and (ii) the tabs 148 extending under the lower face 106 of the bottom wall 104, the tabs 148 retaining the receptacle 142 in the bin aperture 130. As best seen in FIGS. 7 and 8, when connected to the storage bin 100, the receptacle 142 extends below the bottom wall 104 of the storage bin 100.

It is contemplated that only one or more than two accessory holder assemblies 140 could be connected to the front storage bin 100. Furthermore, it is contemplated that the storage bin 100 could be free of bin apertures 130 and panels 132, and that the receptacles 142 could be integrally formed with the bottom wall 104 of the storage bin 100 in other implementations.

Referring to FIGS. 12 and 13, when the receptacle 142 extends through the bin aperture 130, the receptacle aperture 144 is disposed within the perimeter 108 defined by the side walls 102 of the storage bin 100, as viewed from above. The receptacle aperture 144 is thus accessible from the volume 110 of the storage bin 100, and the receptacle 142 increases the overall cargo volume available in the front storage bin 100. The receptacle aperture 144 has a length 150 defined consistently with the lengthwise dimension of the bin aperture 130 (i.e. extending parallel to the longitudinal center plane 16). The receptacle aperture 144 also has a width 152 defined consistently with the widthwise dimension of the bin aperture 130 (i.e. extending perpendicular to the longitudinal center plane 16). In the present implementation, the length 150 of the receptacle aperture 144 is greater than the width 152 of the receptacle aperture 144, but could be otherwise in other implementations.

Referring to FIG. 8, a height 154 of a portion 156 of the receptacle 142 extending below the bottom wall 104 of the storage bin 100 is greater than the length 150 and the width 152 of the receptacle aperture 144 (FIG. 13). In addition, the height 154 of the portion 156 of the receptacle 142 is greater than the height 109 of the side walls 102 of the storage bin 100. As such, the cargo volume provided by each receptacle 142 is suited to carry elongated accessories 300, such as the chainsaw 310, snipper 320 and saw 330 illustrated in FIGS. 10 and 11. It is contemplated that the left and right receptacles 142 could also have different heights 154 for their respective portion 156 in other implementations. In addition, it is to be understood that when the storage bin lid 120 is closed, access to the receptacle apertures 144 is prevented.

Referring to FIGS. 7 to 9, the receptacle 142 is skewed relative to the bottom wall 104 of the storage bin 100 such that a center of the bottom 158 of the receptacle 142 is closer to the longitudinal center plane 16 than a center of the receptacle aperture 144. Having the receptacle 142 skewed this way may facilitate, under some conditions, insertion and withdrawal of the accessory 300 from the receptacle 142 from the side of the ATV 10. In addition, having the receptacle 142 skewed may limit the interference of the receptacle 142 with components of the ATV 10 disposed within the front wheel well 99.

Still referring to FIGS. 7 to 9, a drain assembly 160 is connected to the bottom 158 of the receptacle 142. The drain assembly 160 is in fluid communication with the receptacle 142 and permits drainage of liquids that might be present in the receptacle 142. In the present implementation, the drain assembly 160 is a duck bill drain 162, but other drain assemblies could be used. The duck bill drain 162 is accessible from the wheel well 99 of the ATV 10, as seen in FIG. 1. The duck bill drain 162 includes a resilient member having a slit defined therein. To drain liquids from the receptacle 142, a user can reach and pinch the resilient member of the duck bill drain 162 so as to open the slit to drain the liquid out of the receptacle 142.

Still referring to FIGS. 7 to 9, the left and right accessory holder assemblies 140 are disposed rearward of the radiator assembly 96 of the ATV 10. More particularly, the left and right receptacles 142 are disposed rearward of the radiator assembly 96. Each receptacle 142 has a forward-projecting mounting bracket 170. The radiator assembly 96 has left and right rearward-projecting mounting brackets 172. Each receptacle 142 is secured to the radiator assembly 96 via a fastener 174 connecting the mounting brackets 170, 172 together. Having each of the receptacles 142 secured to the radiator assembly 96 further stabilizes the connection of the accessory holder assembly 140 to the ATV 10. The left and right receptacles 142 could be further connected to the ATV 10 otherwise in other implementations.

It is to be noted that in the present implementation, both the tabs 148 and the mounting brackets 170 are disposed between the receptacle aperture 144 (and the flange 146) and the bottom 158 of the receptacle 142. Furthermore, both the tabs 148 and the mounting brackets 170 connect the receptacle 142 of the accessory holder assembly 140 to the ATV 10.

Still referring to FIGS. 7 to 9, the left receptacle 142 is disposed forward of the front left shock absorber assembly 36. As best seen in FIG. 9, the left receptacle 142 is disposed laterally between the lower end 40 and the upper end 42 of the left shock absorber assembly 36. Similarly, the right receptacle 142 is disposed forward of the front right shock absorber assembly 36, and as best seen in FIG. 9, the right receptacle 142 is disposed laterally between the lower end 40 and the upper end 42 of the right shock absorber assembly 36. The left and right receptacles 142 could be disposed otherwise in other implementations.

Figure 15:
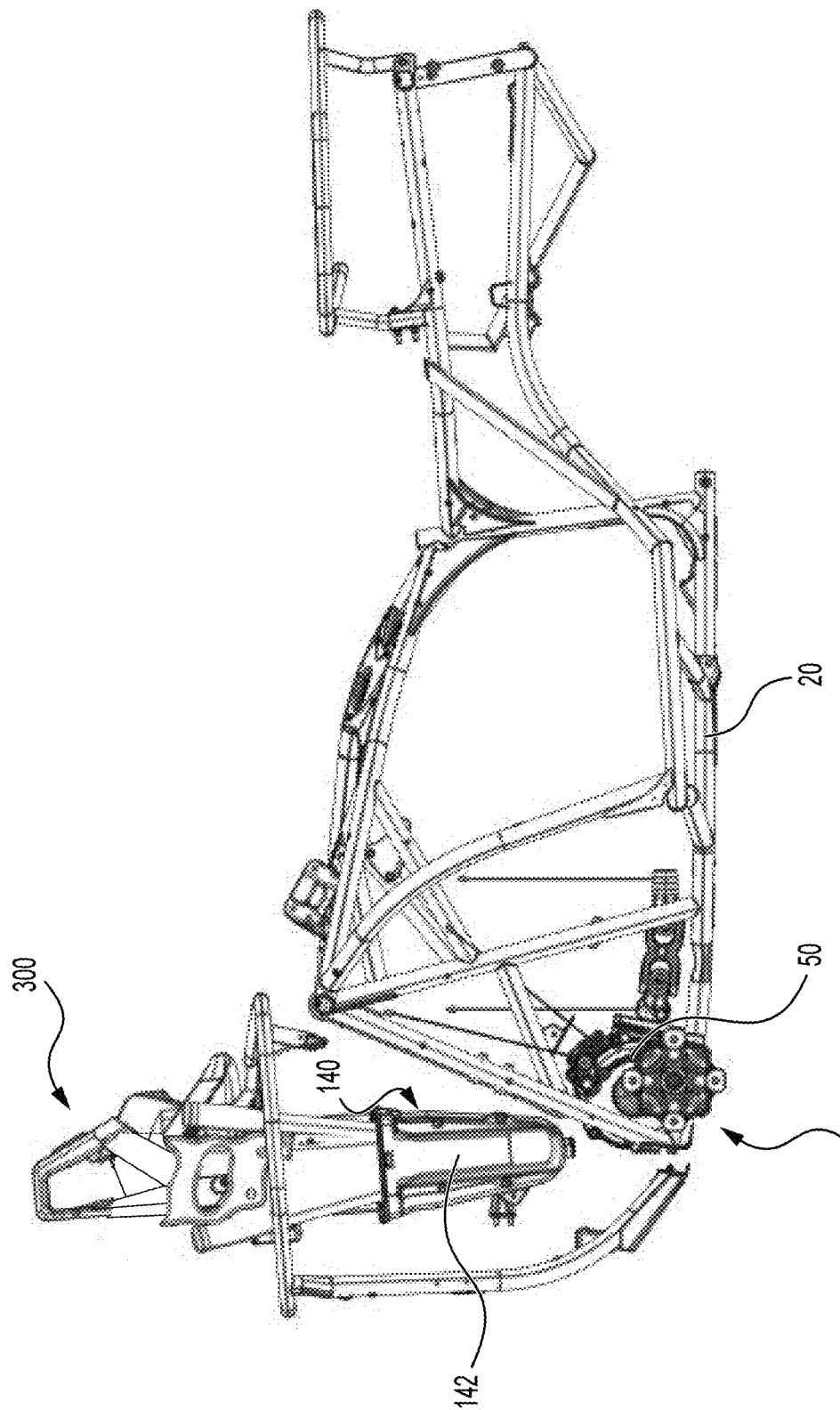
FIG. 15 is a left side elevation view of the components of FIG. 14.

Referring to FIGS. 9 and 14, the left and right accessory holder assemblies 140 are disposed on opposite sides of the longitudinal center plane 16 of the ATV 10. The left accessory holder assembly 140 is disposed on the left side of the front differential assembly 50, and the right accessory holder assembly 140 is disposed on the right side of the front differential assembly 50. Referring to FIGS. 8, 14 and 15, the left and right receptacles 142 are disposed forward of the front axle assembly 60, and more particularly forward of the universal joints 58, 54. The left and right receptacles 142 could be disposed otherwise in other implementations.

Turning now to FIGS. 12 and 16A to 18C, the right accessory holder assembly 140 will be described in more detail in conjunction with the chainsaw 310 being the accessory 300 received in the receptacle 142. The chainsaw 310 has a blade 312 and a power pack 316 and, as will become apparent from the description below, the blade 312 and the power pack 316 are respectively received and supported by the right accessory holder assembly 140.

The right accessory holder assembly 140 includes a bracket 180. The bracket 180 is L-shaped. The bracket 180 has a generally vertical portion 182 and a generally horizontal portion 184 interconnected using fasteners 186 (FIG. 16B). The portions 182, 184 could be integrally formed in other implementations. The portion 182 extends in the storage bin 100 and is connected to the receptacle 142. The portion 184 projects laterally away from the portion 182 and outside the perimeter 108 defined by the side walls 102 of the storage bin 100. In other words and as best seen in FIGS. 10 to 13, the portion 184 of the bracket 180 extends outside the volume 110 of the storage bin 100. The storage bin lid 120 is disconnected from the storage bin 100 when the bracket 180 is used. It is contemplated that the storage bin lid 120 could be adapted to permit its use when the bracket 180 is used.

Referring to FIGS. 5, 6, 16A and 16B, the portion 184 of the bracket 180 will first be described. A lock 200 is mounted to the portion 184 of the bracket 180 for securing the accessory holder assembly 140 to the ATV 10. The lock 200 selectively locks the bracket 180 to the ATV 10 when inserted in a recess 202 (FIGS. 5 and 6) defined on the right side of the ATV 10 and upon rotation of a lever 204. In the present implementation, the lock 200 is similar to the anchor described in U.S. Pat. No. 8,875,830 B2, which is incorporated by reference herein. The lock 200 could be configured otherwise.

Figure 16A:
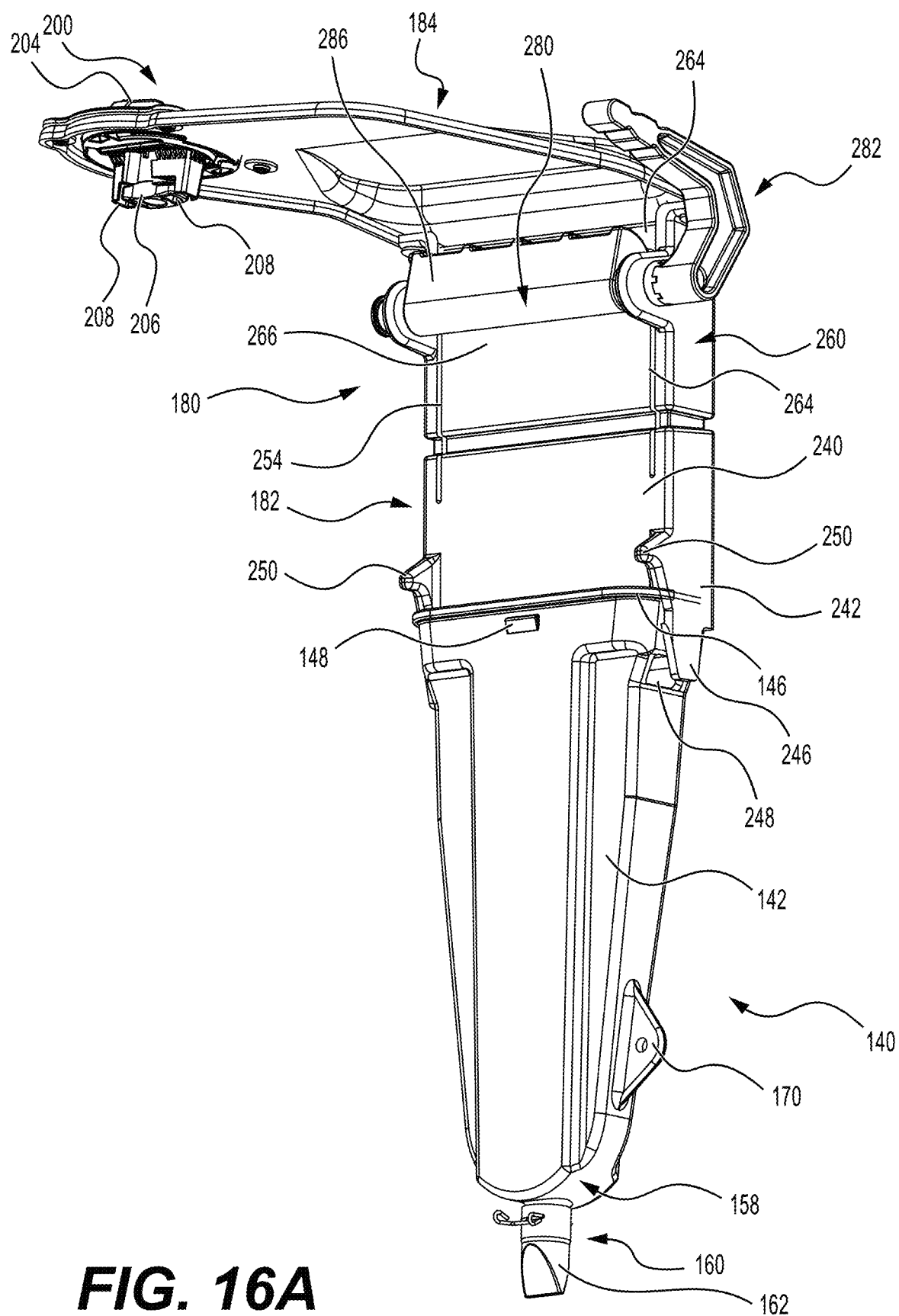
FIG. 16A is a perspective view, taken from a bottom, front, right side of an accessory holder assembly, with a clamp in an unclamped position.
Figure 16B:
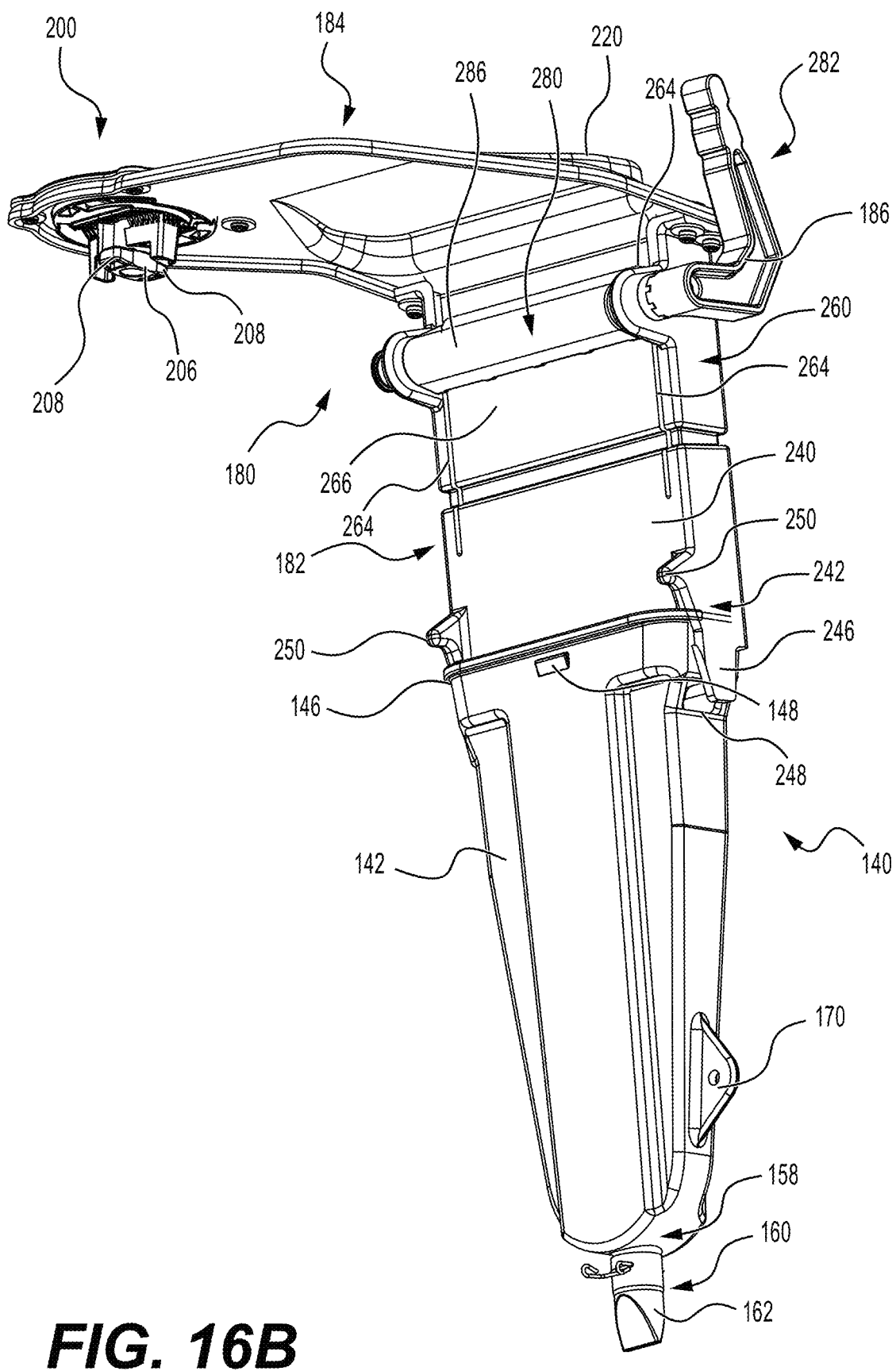
FIG. 16B is a perspective view, taken from a bottom, front, right side, of the accessory holder assembly of FIG. 16A, with the clamp in a clamped position.

Referring to FIGS. 16A and 16B, the lock 200 includes a latch member 206 that is connected to the lever 204. The latch member 206 includes a pair of cams 208 constituting a lower flange of the lock 200. The pair of cams 208 defines a hexagonal shape that is congruent with the recess 202 provided on the ATV 10 which is shaped for receiving the latch member 206 of the lock 200. The pair of cams 208 is rotatable between an unlocked position (FIG. 16A) and a locked position (FIG. 16B) when the lever 204 is rotated by about 90 degrees. The lock 200 is a manually operable lock, which means that the lock 200 can be configured in the unlocked and locked positions upon manual operation of the lever 204 and without any tools.

In the unlocked position, shown in FIG. 16A, the pair of cams 208 is oriented to be congruent with the recess 202, making the latch member 206 insertable into, and removable from the recess 202. In the locked position, shown in FIG. 16B, the latch member 206 is rotated by about 90 degrees from the unlocked position, thus preventing the latch member 206 from being removed from the ATV 10 when received in the recess 202. It is contemplated that other types of locks 200 could be employed. The lock 200 thus secures the bracket 180 and the accessory holder assembly 140 to the ATV 10.

Figure 17A:
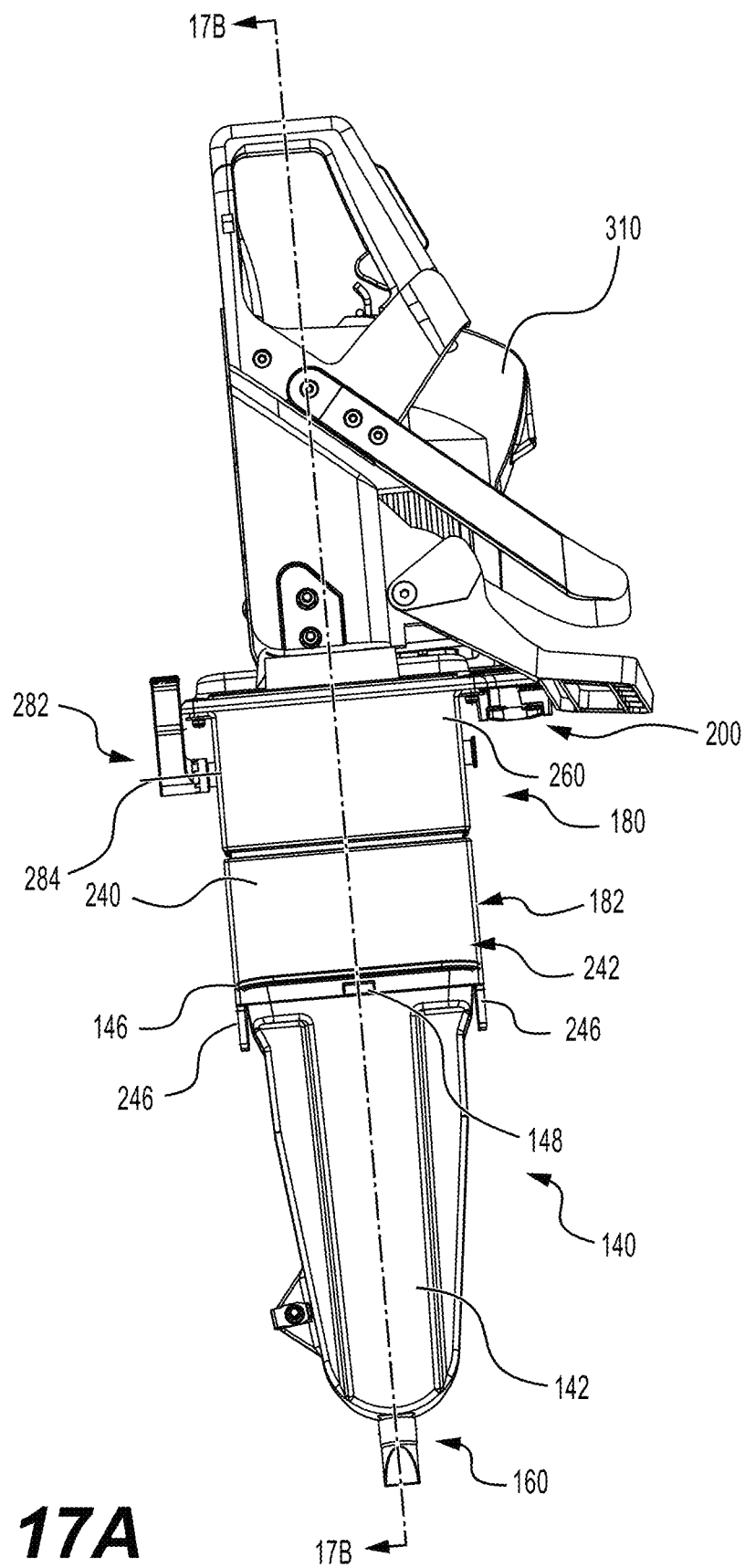
FIG. 17A is a left side elevation view of the accessory holder assembly of FIG. 16A, with a chainsaw received therein and the clamp in the unclamped position.
Figure 17B:
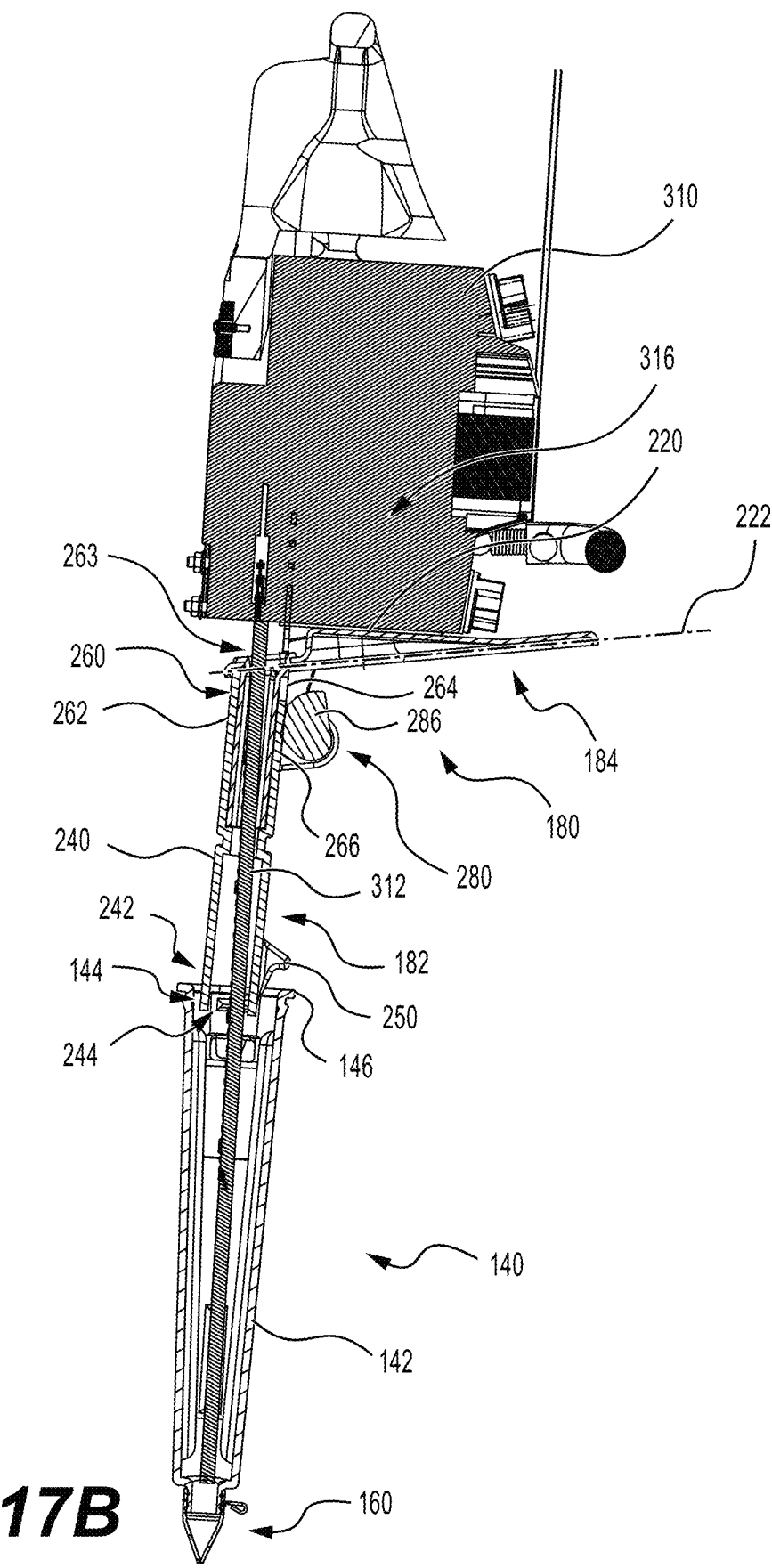
FIG. 17B is a cross-sectional view of the accessory holder assembly and chainsaw of FIG. 17A taken along the cross-section line 17B-17B of FIG. 17A.
Figure 18A:
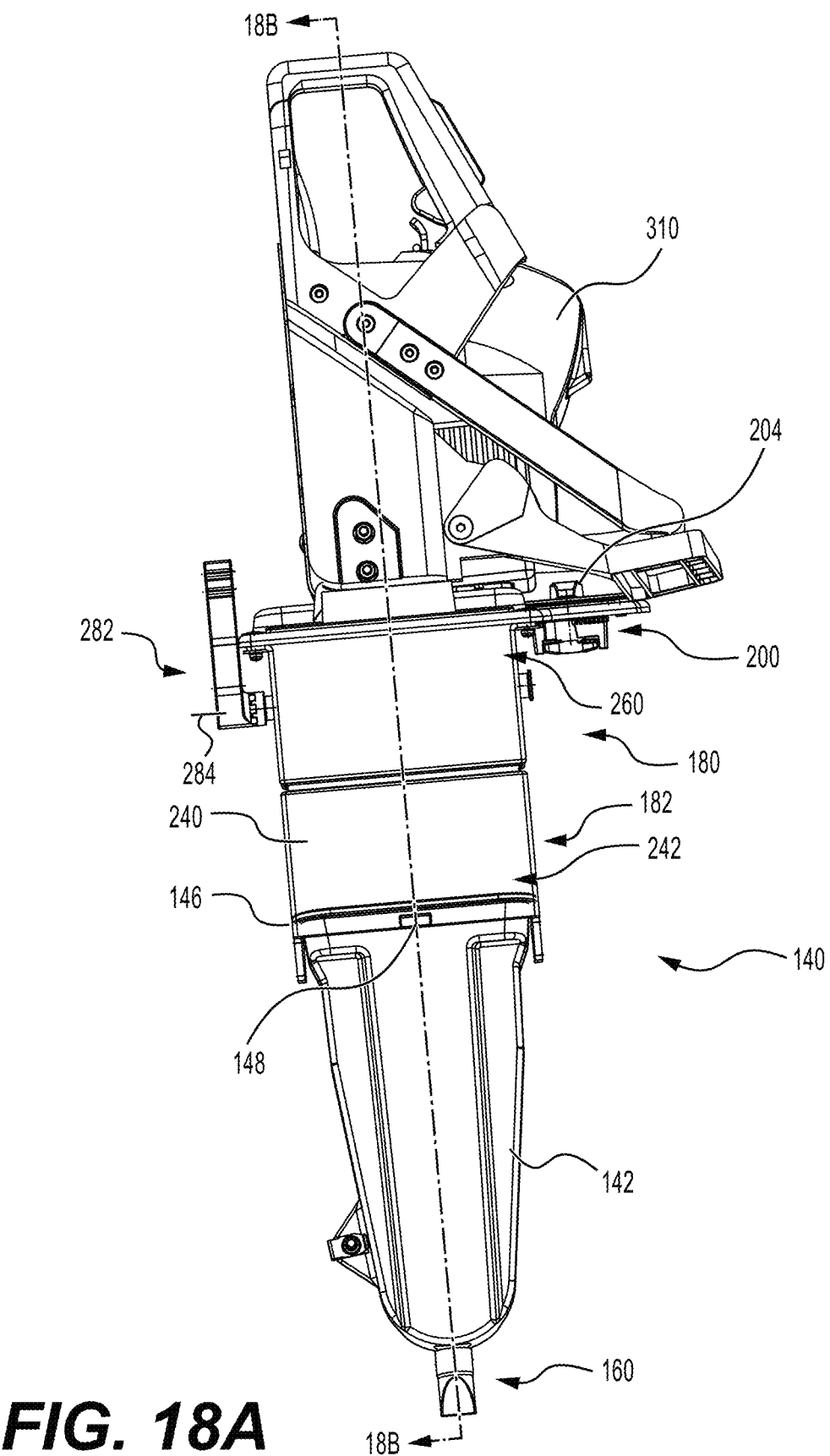
FIG. 18A is a left side elevation view of the accessory holder assembly of FIG. 16B, with a chainsaw received therein and the clamp in the clamped position.
Figure 18B:
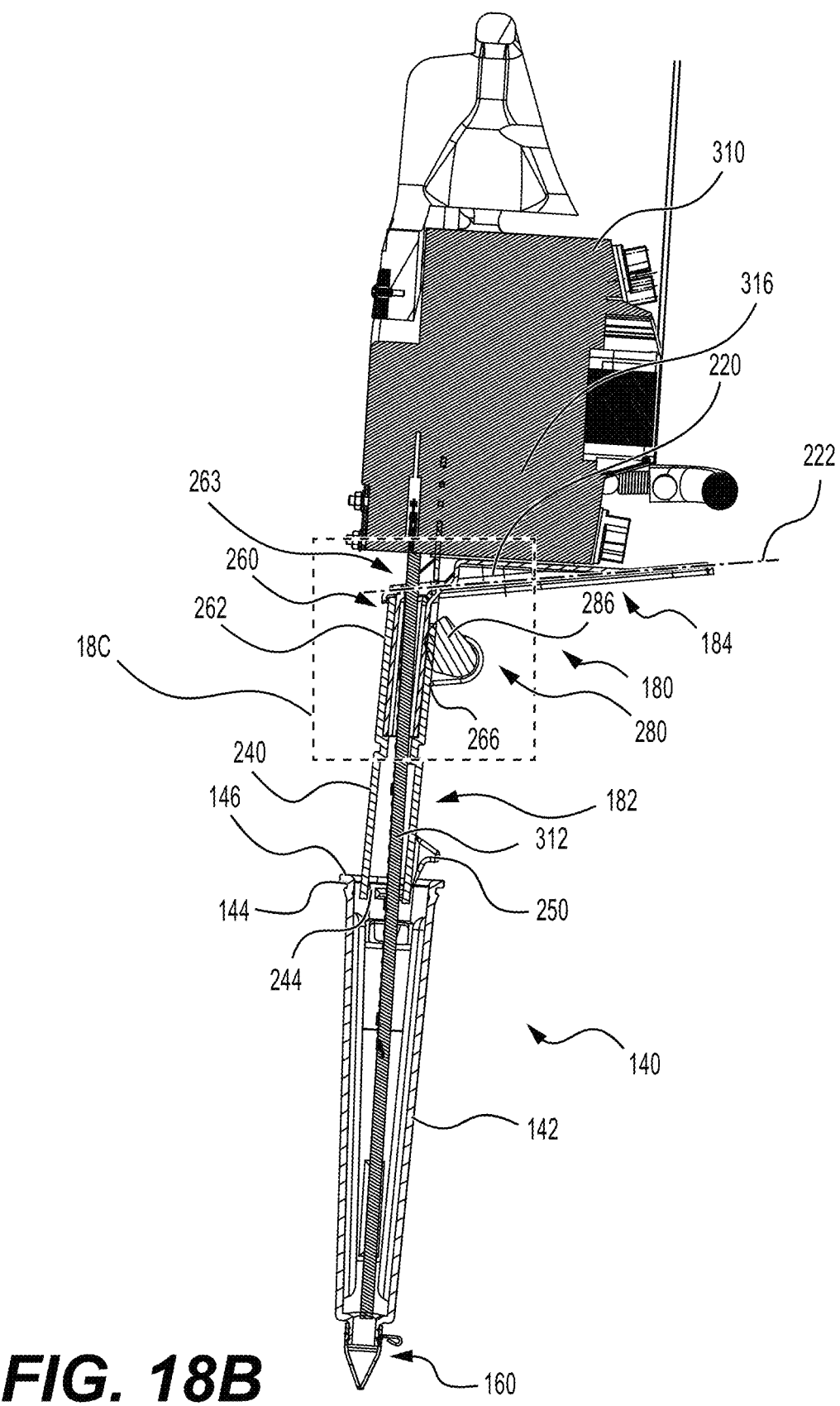
FIG. 18B is a cross-sectional view of the accessory holder assembly and chainsaw of FIG. 18A taken along cross-section line 18B-18B of FIG. 18A.

Referring to FIGS. 17B and 18B, the portion 184 of the bracket 180 has a platform 220. The platform 220 is integrally formed in the portion 184, but could be provided as a separate component in other implementations. The platform 220 is shaped and dimensioned for supporting the power pack 316 of the chainsaw 310 when the blade 312 is received in the receptacle 142. More particularly, the platform 220 is inclined and elevated relative to a plane 222 containing the portion 184 of the bracket 180 so as to support the power pack 316 of the chainsaw 310. Having the power pack 316 supported by the platform 220 reduces the stress applied to the blade 312 as the power pack 316 is generally heavy. The platform 220 could be shaped and dimensioned otherwise in other implementations to support a different accessory 300.

Referring now to FIGS. 12 and 16A to 18C, the portion 182 of the bracket 180 will be described in more details. The portion 182 of the bracket 180 is an extension sleeve 240 removably connected to the receptacle 142. The extension sleeve 240 is a hollow member, as best seen in FIGS. 17B and 18B. When connected to the receptacle 142, the extension sleeve 240 extends in the storage bin 100, above the bottom wall 104, as best seen in FIG. 12.

The extension sleeve 240 has a lower portion 242 defining a downwardly facing bottom aperture 244 of the extension sleeve 240. The lower portion 242 has downwardly projecting hooks 246 that are insertable in corresponding hook apertures 248 defined in the receptacle 142 below the flange 146. When the hooks 246 extend through the hook apertures 248, the lower portion 242 of the extension sleeve 240, and thus the bracket 180, is connected to the receptacle 142. Stops 250 project laterally from the lower portion 242. The stops 250 abut the flange 146 of the receptacle 142 to limit the insertion of the lower portion 242 into the receptacle 142. The downwardly facing bottom aperture 244 and the upwardly facing receptacle aperture 144 are in alignment and permit passage of an accessory 300 from the extension sleeve 240 to the receptacle 142. As seen in FIGS. 17B and 18B, the blade 312 of the chainsaw 310 extends through the extension sleeve 240, the bottom aperture 244 and the receptacle aperture 144.

The extension sleeve 240 further has an upper portion 260 defining an upwardly facing top aperture 262. The top aperture 262 is in alignment with an aperture 263 defined in the portion 184 of the bracket 180, and with the bottom aperture 244 such that passage of an accessory 300 from the aperture 263, the top aperture 262 and to the receptacle 142 is permitted. Two vertically extending slots 264 and one horizontally extending slot 264 (FIGS. 16A and 16B) are defined in the right-side wall of the upper portion 260 of the extension sleeve 240, forming a resilient, flexible flap 266, best seen in FIG. 18C.

Figure 18C:
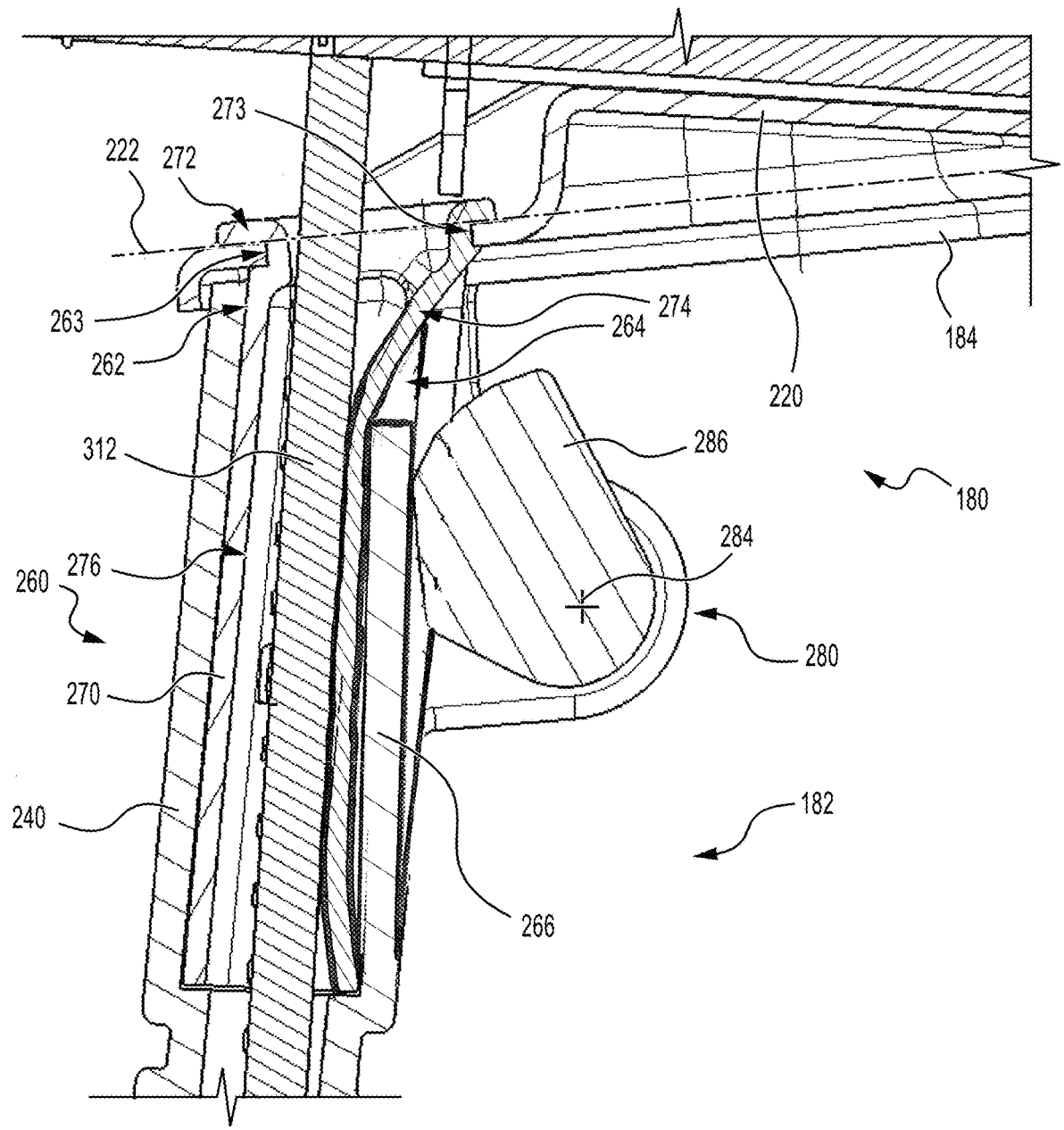
FIG. 18C is an enlarged view of portion 18C of FIG. 18B.

Referring to FIG. 18C, the accessory holder assembly 140 further has a resilient liner 270 disposed inside the extension sleeve 240. The resilient liner 270 extends in the upper portion 260 of the extension sleeve 240. The resilient liner 270 also extends through the aperture 263 of the portion 184 of the bracket 180. The resilient liner 270 has a lip portion 272 surrounding the aperture 263. The lip portion 272 is connected to portion 184 of the bracket 180 as the portion 184 engages a groove 273 defined in the resilient liner 270. The resilient liner 270 further has a portion 274 extending adjacent the flap 266 of the upper portion 260, and a portion 276 extending adjacent the left-side wall of the upper portion 260. The resilient liner 270 is made of a resilient material, such as a rubber-based polymeric material.

Referring to FIGS. 16A to 18C, the accessory holder assembly 140 further has a clamp 280 for retaining the accessory 300 (in the FIGS. 16A to 18C, the chainsaw 310) inside the extension sleeve 240. The clamp 280 includes a cam lever assembly 282 rotatably connected to the upper portion 260 of the extension sleeve 240. The cam lever assembly 282 is movable about a cam pivot axis 284 between an unclamped position, seen in FIGS. 16A, 17A and 17B, and a clamped position, seen in FIGS. 16B, 18A to 18C. The cam lever assembly 282 includes an eccentric member 286 that abuts the flap 266 of the upper portion 260 of the extension sleeve 240.

When the blade 312 of the chainsaw 310 is received in the extension sleeve 240 and when the cam lever assembly 282 is moved from the unclamped position to the clamped position, the eccentric member 286 rotates about the cam pivot axis 284 (in the counter-clockwise direction when referring to FIG. 18C) and abuts the flap 266, which in turn biases the portion 274 of the resilient liner 270 toward the blade 312 of the chainsaw 310 and the left-side wall of the upper portion 260. After the cam lever assembly 282 has been moved in the clamped position, the portion 274 of the resilient liner 270 is compressed between the blade 312 and the flap 266. The portion 276 of the resilient liner 270, on the opposite side of the blade 312, is also compressed between the left-side wall and the blade 312 as the blade 312 is biased away from the cam lever assembly 282. Thus, the portions 274, 276 of the resilient liner 270, extending on both sides of the blade 312, retain the blade 312 inside the extension sleeve 240. When the cam lever assembly 282 is moved from the clamped position to the unclamped position, the eccentric member 286 rotates about the cam pivot axis 284 (in the clockwise direction when referring to FIG. 18C), the portions 274, 276 of the resilient liner 270 are relaxed, the flap 266 resiliently reverts to its initial position (shown in FIG. 17B), and the blade 312 is no longer retained inside the extension sleeve 240.

Thus, in the present implementation, the right-side accessory holder assembly 140 is adapted to support and retain the chainsaw 310 on the ATV 10 while the ATV 10 is being operated on different kinds of terrains. Finally and referring to FIG. 5, it is to be noted that another recess 202 is provided on the left side of the ATV 10, and that a bracket being in some implementations a mirror image of the bracket 180 and with necessary adaptations could be connected to the receptacle 142 of the accessory holder assembly 140 disposed on the left side of the ATV 10 to provide the ability to carry two chainsaws 310 simultaneously on the ATV 10.

Moreover, since the bracket 180 is connected to the receptacle 142 using the hooks 246, it is connectable and removable from the receptacle 142 without using any tools. The bracket 180 can thus be easily removed such that only the receptacle 142 is used, as it is the case for the left accessory holder assembly 140 shown in the accompanying Figures. When the bracket 180 is removed, the storage bin lid 120 can be used without having to remove the receptacle 142.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An off-road vehicle comprising:
   a frame;
   a motor connected to the frame;
   a steering assembly connected to the frame, the steering assembly including a steering input device;
   a storage bin disposed forward of the steering input device, the storage bin having side walls and a bottom wall; and
   an accessory holder assembly connected to the storage bin, the accessory holder assembly including a receptacle having an upwardly facing receptacle aperture for receiving an accessory,
   the receptacle aperture being disposed within a perimeter defined by the side walls of the storage bin,
   the receptacle extending below the bottom wall of the storage bin, and
   a height of a portion of the receptacle extending below the bottom wall of the storage bin being greater than a width of the receptacle aperture and greater than a length of the receptacle aperture.

2. The off-road vehicle of claim 1, wherein the height of the portion of the receptacle extending below the bottom wall of the storage bin is greater than a height of the side walls of the storage bin.

3. The off-road vehicle of claim 1, wherein the length of the receptacle aperture is greater than the width of the receptacle aperture.

4. The off-road vehicle of claim 1, wherein the accessory holder assembly further includes a lock for securing the accessory holder assembly to the off-road vehicle.

5. The off-road vehicle of claim 4, wherein:
   the accessory holder assembly further includes a bracket connected to the receptacle,
   the lock is mounted to the bracket, and
   the bracket has a platform for supporting a first portion of the accessory when a second portion of the accessory is received in the receptacle.

6. The off-road vehicle of claim 5, wherein:
   the bracket has first and second portions defining a L-shape;
   the first portion is removably connected to the receptacle and extends in the storage bin,
   the second portion projects laterally away from the first portion and outside the perimeter defined by the side walls of the storage bin,
   the lock is mounted to the second portion of the bracket,
   the lock includes a latch member, and
   the off-road vehicle defines a recess for receiving the latch member of the lock.

7. The off-road vehicle of claim 1, wherein:
   the bottom wall of the storage bin defines a bin aperture; and
   the receptacle extends through the bin aperture.

8. The off-road vehicle of claim 7, wherein:
   the accessory holder assembly further has a flange surrounding at least in part the receptacle aperture and a tab projecting from the receptacle below the flange,
   the flange abuts an upper face of the bottom wall of the storage bin surrounding the bin aperture, and
   the tab extends under a lower face of the bottom wall of the storage bin adjacent the bin aperture such that the bottom wall of the storage bin is retained between the flange and the tab.

9. The off-road vehicle of claim 1, wherein the accessory holder assembly further includes an extension sleeve removably connected to the receptacle, the extension sleeve extending in the storage bin, above the bottom wall of the storage bin.

10. The off-road vehicle of claim 9, wherein the accessory holder assembly further includes a resilient liner disposed inside the extension sleeve, and a clamp for retaining the accessory inside the extension sleeve.

11. The off-road vehicle of claim 10, wherein the clamp includes a cam lever assembly movable between a clamped position and an unclamped position, the cam lever assembly biasing the resilient liner for retaining the accessory inside the extension sleeve when moved from the unclamped position to the clamped position.

12. The off-road vehicle of claim 1, further comprising a radiator assembly connected to the frame and fluidly connected to the motor, the accessory holder assembly being disposed rearward of the radiator assembly.

13. The off-road vehicle of claim 12, wherein the receptacle is secured to the radiator assembly.

14. The off-road vehicle of claim 1, further comprising:
   left and right front suspension assemblies operatively connected to the frame, each of the left and right front suspension assemblies including a shock absorber assembly; and
   left and right front ground engaging members operatively connected to the left and right front suspension assemblies respectively;
   wherein the receptacle is disposed forward of the shock absorber assemblies.

15. The off-road vehicle of claim 14, wherein:
   each of the shock absorber assemblies has an upper end and a lower end; and
   the receptacle is disposed laterally between the upper end and the lower end of one of the shock absorber assemblies.

16. The off-road vehicle of claim 14, further comprising a front axle assembly operatively connected to the left and right front ground engaging member, the receptacle being disposed forward of the front axle assembly.

17. The off-road vehicle of claim 1, wherein the receptacle is skewed relative to the bottom wall of the storage bin.

18. The off-road vehicle of claim 17, further comprising a front differential assembly connected to the frame and operatively connected to the motor, the longitudinal center plane intersecting the front differential assembly; and
   wherein the first accessory holder assembly is disposed on a first side of the front differential assembly, and the second accessory holder assembly is disposed on a second side of the front differential assembly.

19. The off-road vehicle of claim 1, further comprising a storage bin lid removably connected to the storage bin and preventing access to the receptacle aperture when closed.

20. The off-road vehicle of claim 19, wherein a portion of the accessory holder assembly extends outside the storage bin when the storage bin lid is closed.

* * * * *